US006995689B2

(12) United States Patent
Crank

(10) Patent No.: US 6,995,689 B2
(45) Date of Patent: Feb. 7, 2006

(54) METHOD AND APPARATUS FOR TRACKING AIRCRAFT AND SECURING AGAINST UNAUTHORIZED ACCESS

(76) Inventor: Kelly C. Crank, 3670 SE. El Camino Dr., Gresham, OR (US) 97080

( * ) Notice: Subject to any disclaimer, the term of this patent is extended or adjusted under 35 U.S.C. 154(b) by 0 days.

(21) Appl. No.: 10/435,337

(22) Filed: May 8, 2003

(65) Prior Publication Data

US 2003/0193409 A1 Oct. 16, 2003

Related U.S. Application Data

(63) Continuation-in-part of application No. 10/269,169, filed on Oct. 10, 2002.

(60) Provisional application No. 60/328,620, filed on Oct. 10, 2001.

(51) Int. Cl.
*G08B 23/00* (2006.01)

(52) U.S. Cl. ...................... 340/970; 340/961; 340/963; 701/4; 701/14

(58) Field of Classification Search ................ 340/970, 340/963, 961, 945; 701/3, 4, 9, 14, 120, 701/301
See application file for complete search history.

(56) References Cited

U.S. PATENT DOCUMENTS

| 4,086,632 | A | | 4/1978 | Lions ................... 343/112 PT |
|---|---|---|---|---|
| 4,528,564 | A | * | 7/1985 | Trampnau ................... 340/946 |
| 5,153,836 | A | * | 10/1992 | Fraughton et al. .......... 701/301 |
| 5,570,095 | A | | 10/1996 | Drouilhet, Jr. et al. ...... 342/357 |
| 5,574,648 | A | | 11/1996 | Pilley .......................... 340/945 |
| 5,640,297 | A | | 6/1997 | Labaze ........................ 361/683 |
| 5,714,948 | A | | 2/1998 | Farmakis et al. ............ 340/961 |
| 5,798,458 | A | | 8/1998 | Monroe ........................ 73/587 |
| 5,890,079 | A | | 3/1999 | Levine .......................... 701/14 |
| 5,902,351 | A | | 5/1999 | Streit et al. .................. 701/220 |
| 5,933,098 | A | | 8/1999 | Haxton ....................... 340/945 |
| 5,952,961 | A | | 9/1999 | Denninger ............. 342/357.08 |
| 5,974,349 | A | | 10/1999 | Levine .......................... 701/29 |
| 6,006,159 | A | | 12/1999 | Schmeir et al. ............. 701/200 |
| 6,092,008 | A | * | 7/2000 | Bateman ....................... 701/14 |
| 6,133,867 | A | * | 10/2000 | Eberwine et al. ............. 342/29 |
| 6,188,956 | B1 | | 2/2001 | Walters ....................... 701/200 |
| 6,199,008 | B1 | | 3/2001 | Aratow et al. .............. 701/120 |
| 6,308,045 | B1 | | 10/2001 | Wright et al. ................ 340/945 |
| 6,385,513 | B1 | * | 5/2002 | Murray et al. ................ 701/14 |
| 6,512,529 | B1 | | 1/2003 | Janssen et al. .............. 345/790 |
| 6,681,158 | B2 | * | 1/2004 | Griffith et al. ................. 701/3 |
| 6,799,094 | B1 | * | 9/2004 | Vaida et al. .................... 701/3 |

* cited by examiner

*Primary Examiner*—Brent A. Swarthout
(74) *Attorney, Agent, or Firm*—John Smith-Hill; Smith-Hill and Bedell

(57) ABSTRACT

A system for monitoring an aircraft receives navigation signals and deriving a position vector therefrom and also receives an input representative of altitude of the aircraft above ground level. The system samples the position vector at a selected sample rate and outputs a succession of samples of the position vector, the sample rate depending on whether the altitude of the aircraft above ground level is less than a predetermined value. Data packets that contain respective samples of the position vector are transmitted to a ground-based receiving station. The ground-based receiving station may calculate secondary data.

24 Claims, 13 Drawing Sheets

Data Acquisition

FIFO Data Transfer

LIFO Data Transfer

Indexed Data Transfer

METHOD AND APPARATUS FOR TRACKING AIRCRAFT AND SECURING AGAINST UNAUTHORIZED ACCESS

CROSS-REFERENCE TO RELATED APPLICATION

This application is filed as a continuation-in-part of U.S. patent application Ser. No. 10/269,169 filed Oct. 10, 2002. U.S. patent application Ser. No. 10/269,169 claims benefit of U.S. Provisional Application No. 60/328,620 filed Oct. 10, 2001.

BACKGROUND OF THE INVENTION

This invention relates to a method and apparatus for tracking aircraft and securing against unauthorized access.

Increasing demands upon the systems, methods and infrastructure of commercial aviation have prompted advances in technology pertaining to aircraft surveillance and communication. These systems, which include ADS, ADS-B and FANS CNS/ATM have enabled reduction of aircraft separation, and improvement in Air Traffic Control management of aircraft within coverage of regional airspace.

Despite varied solutions presented by existing and emerging technologies, little effort or advancements have been made that may adequately protect against recurrence of the tragic events of Sep. 11, 2001.

Reinforcement of cockpit doors and proposed arming of airline pilots provide physical barrier and defensive deterrence against aggressive actions of those harboring malicious intent relative to airline industry. Unfortunately, these methods substantially increase cost for retrofitting aircraft, but fail to protect against access gained through forged or stolen flight crew identification. Additionally, reinforced cockpit doors may be compromised at the point of ingress/egress of the flight crew into the area of the cockpit.

Existing procedural measures rely upon the pilot and co-pilot to detect any intrusion into the cockpit, and notify regional ATC through textual input of emergency squawk code(s) into the transponder or satellite-based data-link. Encoding of codes or textual messages failed to adequately alert ATC of breach of the flight deck of any of the aircraft involved in the Sep. 11, 2001 hijackings.

Objective of the present invention, was therefore, a means of identifying authorized personnel with secondary comprehensive monitoring of the controlled space, sufficient to detect and exclude non-authorized personnel from the controlled space. Detected breach of flight deck or controlled space prompts the present invention to initiate immediate encoded notification of ATC and authorities through automatic transmission of alert code(s) by primary and secondary means of wireless communication.

Existing surveillance systems, such as ADS and FANS, CNS/ATM enable approximations of an aircraft's position in relationship to navigational lines or transmitted course intent, but fail to correlate the location of an aircraft outside of certain navigational boundaries, nor do these systems correlate precise positional representation of an aircraft in relationship to detailed geographic display of the underlying terrain. In the event of compromise of a transponder or operational failure, ATC personnel are hampered in determining relative location of an aircraft.

Certain objectives of the present invention include selectable ability to display detailed graphic representation of an aircraft's precise position in relationship to identifiable geographic detail, including but not limited to, correlation of flight path or deviations relative to cities, buildings or landmarks, controlled spaces, waterways, topographical detail or emergency response facilities. It was an additional objective to provide an ATC selectable means of automatic vector display to the nearest primary or secondary airports, in the event an aircraft encountered difficulty.

Existing and emerging technologies permit approximations of aircraft location, relative to assigned navigational tracks for inter-continental travel. While existing means enable improved air traffic management over vast oceanic surfaces, they are less useful in the event the aircraft fails to reach its destination.

It was an additional objective of the present invention to develop means for an equipped aircraft to continually monitor trajectory and determine any imminent controlled or uncontrolled flight into terrain, with automatic notification of the nearest Search And Rescue or response facilities, minutes prior to the aircraft's crash (Net Terminal Location). This objective included automatically generated geographic-correlated map display, in which a reverse vector line provides detail of compass heading and nautical miles to the calculated latitude and longitude of the aircraft's Net Terminal Location.

Current or proposed surveillance systems rely upon satellite transmission of comprehensive positional data, including; aircraft identification, velocity (airspeed), elevation, course heading, latitude, longitude, and course intent with some systems also reporting control surface settings. There are currently approximately three thousand aircraft in operation over the United States at any given time, with projections for substantial increase in the coming years, placing an ever-increasing demand upon existing satellite systems.

The described embodiment of the invention allows reduction in length of aircraft positional coordinates, while retaining ability to monitor dynamic position of the aircraft on a three-dimensional basis through use of shorter positional transmissions. The realization of this objective may proportionately reduce cost to the airlines relative to satellite transmission time, and increase efficiency of satellites to handle increasing numbers of aircraft in the future.

Historically, aircraft safety has been enhanced by extracting and analyzing data contained in one or more on-board flight recorders. These systems include CVR (Cockpit Voice Recorders) and DFDR (Digital Flight Data Recorders). Analysis of existing recorders is limited to retrieval after a plane has crashed, and often these recorders cannot be located, or have sustained damage that prohibit obtaining useful data or recordings.

Objectives of the present invention include ability to record audio, video and data in separate channels in multiple recorder stages, including a rapidly addressable buffer array which permit programming length of recording time commensurate with flight duration, and a secondary non-volatile data storage medium sufficient for archive storage of higher resolution audio and video.

Development goals included ability to remotely access either recording stage, transmitting data in FIFO (First In First Out), Indexed Access (identified record, or a range between two indexes) and LIFO (Last In First Out), which permits immediate download of the most current recording. This latter method enables download of the most recent data or audio, first, thus prioritizing recovery of the most chronologically current recording(s) pertaining to an incident or contingent condition relative to the issuance of an alarm.

Proposed or existing technologies pertain to recording or remote access relative to mechanical conditions of the respective aircraft, or advocate continual transmission of flight recorder voice, video and data to a ground-based facility where they are recorded.

The present invention allows for recording of indexed audio, video and data in separate channels onboard an aircraft or vehicle, and then transmits, upon demand or prerequisite circumstance to a ground-based facility where it is analyzed. This reduces demand upon satellite transmission, while reducing amount of personnel and data storage space needed to monitor aircraft.

Additionally, proposed systems have an inherent problem if they advocate continual transmission of audio and data in real-time, or near real-time. If there is a break in satellite or RF communication continuity, then data may either be lost, or contain blank areas or errors corresponding to the period of communication lapse.

The present invention uses compression algorithms, and burst or packet communication with parity to assure that all elements that are transmitted are properly received by the ground-based receiving center. Additionally, the present invention permits download of data, as many times as desired without posing any interference to ongoing or previously recorded audio, video or data.

SUMMARY OF THE INVENTION

The illustrated embodiment of the present invention provides means of cost-effective global surveillance and tracking, enabling dynamic aircraft positional monitoring of precise correlated geographic specificity. Recent events related to aviation, highlight security and the need for monitoring to enable precise location of aircraft in relationship to geographic identifiers and landmarks.

Existing and proposed systems such as ADS, ADS-B and FANS CNS/ATM provide improved surveillance over broader areas not served by primary or secondary radar, yet are limited to establishing aircraft position, relative to existing navigational lines or transmitted aircraft intent. This places higher responsibility upon the judgment of ATC personnel to deductively correlate, or approximate aircraft position corresponding to geographic surroundings.

The present invention relies upon GNSS derived positional data, and secondary incremental wireless transmissions to ground-based receiving centers. The incremental separation between each sequential positional transmission is dependent upon the aircraft's position in relationship to the underlying terrain.

Existing systems rely upon transmission of positional data from which positional changes of the aircraft may be determined. These positional reports include, velocity, current compass heading, latitude, longitude, altitude and course intent. In contrast, the present invention requires transmission of fewer data elements, latitude, longitude and altitude from which the ground-based receiving center uses the time and distance separation between transmissions to calculate secondary data, including compass heading, deviation, current and average speed, distance, and rate of ascent or descent. By reducing the extent of each positional transmission, the present invention provides more efficient use of satellite(s), or other wireless communications methods, while enabling an operational savings for equipped aircraft.

Algorithms employed by the ground-based receiving center(s) provide additional novel features, including a correlated graphic display with selectable means of automatically plotting a vector line to the nearest primary, secondary or selected airport in the event an aircraft encounters difficulties. The system also displays dynamically updated compass heading and distance to the vectored locations, relative to the advancing position of the aircraft.

In one embodiment of the present invention, the airborne element's incremental GNSS sample rate and corresponding transmission of positional coordinates increase in relationship to proximity to underlying terrain, permitting more rapid and accurate identification of the aircraft's three-dimensional position and trajectory below a given threshold AGL altitude. Continual analysis by the airborne element evaluates altitude, glide path, trajectory (angle), speed, distance and time relative to probability of the aircraft trajectory intersecting underlying terrain or geographic feature(s). In the event control settings are determined unable to prevent projected collision, then airborne element concludes controlled or uncontrolled flight into terrain is imminent. Trajectory data is then used to project latitude, longitude, altitude and time of the aircraft's net terminal location (NTL), prompting immediate alert code transmission to the nearest search and rescue or response facilities with geographic display of the aircraft's last reported coordinates (LRC), net terminal location (NTL) and distance and compass heading from the SAR location(s) back to the aircraft NTL.

Additional alert systems specified within the present invention may either be determined by the equipped aircraft, or the ground-based centers. Methods of re-checking and verifying alert codes decrease chance of error. Codes include, Code 7600, deviation from flight parameter, Code 7700 non-reporting aircraft (absence of positional coordinates), Code 7800 net terminal location and Code 7500 detection of intruder within the controlled space or cockpit.

The preferred embodiment of the present invention allows concurrent, redundant transmission of alert codes by Satellite and transponder/data link, thus reducing chance of compromise of any single system. If both satellite and transponder/data systems are compromised or fail, the ground-based receiving center automatically registers a code 7700 alert (non-reporting aircraft), prompting radio contact and/or dispatch of verifying aircraft to the general locality of the last reported coordinates of the aircraft, for which a code 7700 was registered.

The described embodiment of the invention addresses aircraft security concerns through a means of biometric identification of flight crew prior to take off. In the present invention, text-dependent voice biometrics are relied upon for indexing stored parameters of the known authorized person's voice. Log-on procedure is conducted concurrently between two parallel systems, using an encrypted satellite link. All personnel are required to obtain concurring approval prior to departure. From the point of authorization, all changes are locked-out until the aircraft safely reaches its destination.

Biometric monitoring aspect of the present invention is initiated following crew authorization and continues until the aircraft or vehicle safely reaches its destination. If any voice is detected that differs from the logged authorized personnel, an alert (Code 7500) is transmitted to the ground-based receiving center. Upon verification, the ground-based center queries (download command) the airborne flight recorder system, for wireless transmission of the contents, while the aircraft is still in the air.

The described embodiment of the invention illustrates means of extracting a time-date and position indexed spectrogram, from downloaded aircraft audio enabling comparison and analysis by appropriate agencies or personnel to aid in identification of the alleged intruder. Additionally, elements of this same spectrogram display enable ground-based personnel to advance or reverse aircraft acquired audio, which is dynamically correlated to date, time and positional coordinates.

The referenced flight recorder aspect of the present invention may contain multiple stages, which may function independently or collectively as an integrated system. Elements include an IC buffer array with user definable recording duration or depth, corresponding to determined default settings or duration of individual flights or applications. Recording time of the flight recorder significantly exceeds the recording times of existing CVRs (Cockpit Voice Recorders), and separate indexed channels of audio, video and data may be accessed remotely by wireless means.

A non-volatile data storage device associated with the flight recorder system of the present invention, permits archive storage and may be housed in a crash-survivable enclosure. In one embodiment, robust magneto-optical means is employed with removable 9 GB platters or cartridges.

Either system may be remotely downloaded using compression algorithms, and permit transfer in FIFO (First In First Out), Indexed Access or LIFO (Last In First Out).

BRIEF DESCRIPTION OF THE DRAWINGS

Illustration of the interrelationship of elements, function and advantages of the present invention are provided in the accompanying drawings, in which like references and corresponding reference numbers are identified within the ensuing detailed description. The drawings are intended to illustrate principles of the invention, and are not necessarily to scale.

DETAILED DESCRIPTION

An embodiment of the invention will be described with reference to use of the embodiment in connection with a passenger aircraft. However, it will be appreciated that many features of the invention are applicable to, and may be incorporated in, other mobile vehicles. As used herein, the term mobile vehicle includes a passenger aircraft, a military or commercial transport vehicle (including a manned or un-manned aircraft), and other media of transportation, including marine vessels (ships and boats). The illustrated embodiment includes scalable architecture permitting elements of the embodiment to be installed and utilized in smaller commercial or private aircraft. Additionally, the illustrated embodiment is intended to make maximum use of existing systems and data sources on board the aircraft.

Individual and cumulative functional aspects of the present invention rely upon coordinated relationship between, 1. Airborne Element, 2. Wireless Communication Elements, 3. Ground-based Control Center, and 4. Air Traffic Control.

Abbreviations are utilized in the following manner:

Airborne element (AE) identifies integrated elements and sub-systems installed in the aircraft.

Global navigation satellite system (GNSS) is an inclusive reference to any global navigation systems including, but not limited to, GPS (global positioning system) and GLONASS (global orbiting navigation satellite system).

Satellite communication (SATCOM) is a broad inclusive reference to satellite communication link(s), equipment, constellations or mode of transmitting or receiving data by such means.

Transponder/data link references any interrogated or independent wireless means of conveying transmitted numeric or alphanumeric data and messages from airborne or mobile source to ATC or ground-based receiving centers. This term may include, but is not limited to, mode-s transponders and any VHF data link systems and technologies.

Flight data receiving center (FDRC) corresponds to a plurality of ground-based receiving centers operating ostensibly as one. Functions include concurrent biometric analysis, geo-positional surveillance, tracking, computer-based graphic display, flight recorder download control, aircraft alert code monitoring and response. FDRC locations are broadly spaced to assure comprehensive geographic coverage and communication. Individual FDRC locations are linked by satellite or fiber-optic link, enabling data to be shared between FDRC elements and Air Traffic Control (ATC).

Figure 1:
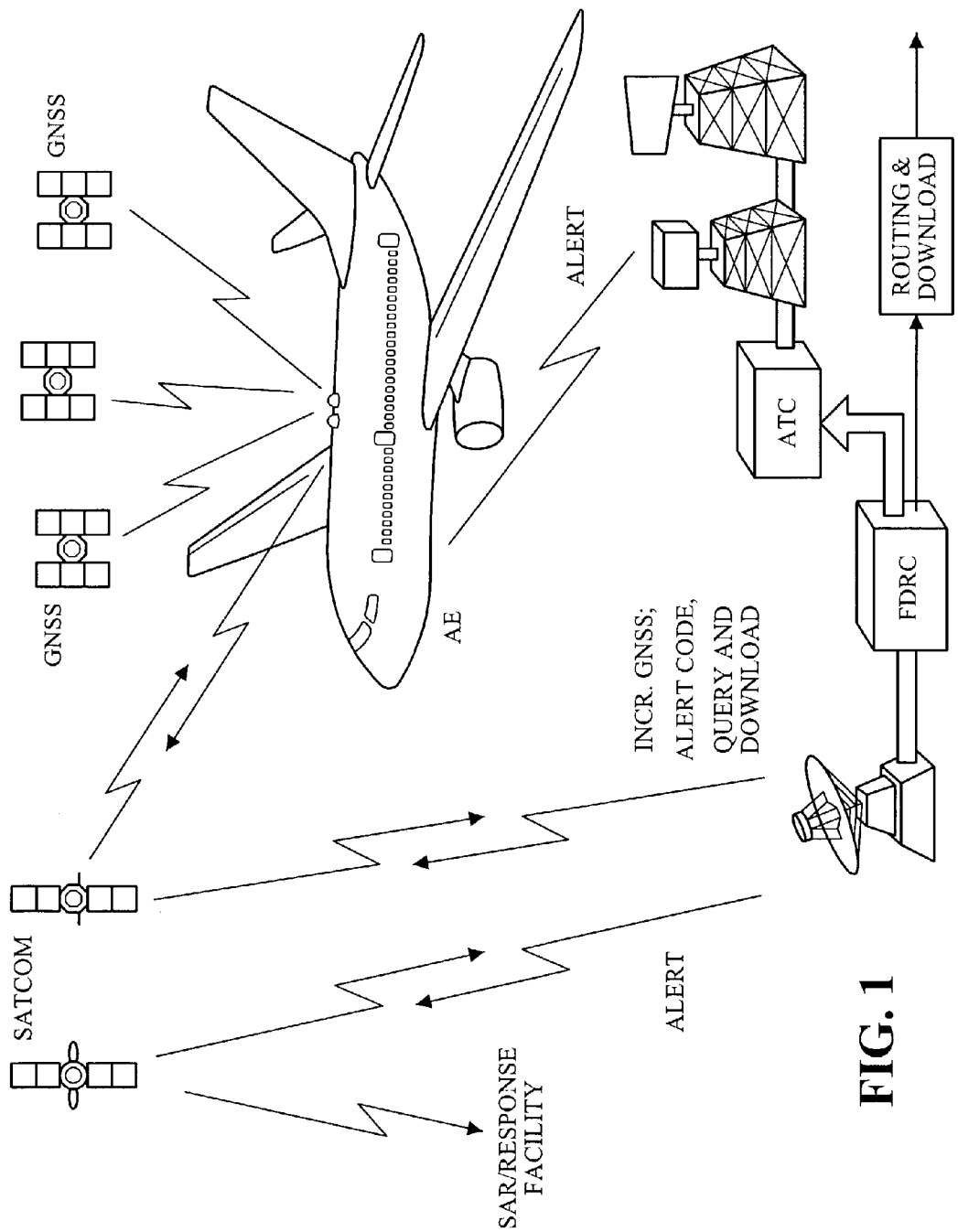
FIG. 1 illustrates the systems of an embodiment of the present invention, including primary and secondary elements and communication links connecting the functional aspects thereof.

FIG. 1 illustrates the interrelationship of primary elements and the corresponding forms of data or signals they generate or relay; including: GNSS (Satellites)—Transmit time indexed signal for geo-positional determination; AE—Receives and interprets GNSS signal, transmits incremental GNSS data to FDRC, transmits contingent alert code(s) to FDRC and ATC. Additionally, AE receives query signal from FDRC, and contingently downloads flight recorder contents; FDRC—Processes and displays AE geo-positional data, processes and verifies Alert Codes, transmits Query commands to AE, receives flight recorder download; Routing & Download—refers to FDRC transfer of alert through hierarchy alert routing (FIG. 3A, 49) and transfer of download and data to end users (FIG. 3B, 77, 78, 86); SATCOM—provides communications link between airborne and ground-based elements, relays FDRC generated alert signal to response to nearest Search And Rescue teams (SAR) or response facilities; ATC Receives transponder/data link redundant alert code transmission from AE.

Systems and elements of the present invention enable transmission of specific alert codes, in response to contingent events detected by sub-system elements. These alert codes, include, but are not limited to: code 7500—detection of an unauthorized individual in the flight deck or other controlled space; Code 7600—substantial deviation from course or heading; Code 7700—non-responding aircraft (no incremental positional transmissions); Code 7800—projected aircraft net terminal location (NTL).

Aircraft Surveillance, Tracking and Display

Figure 2:
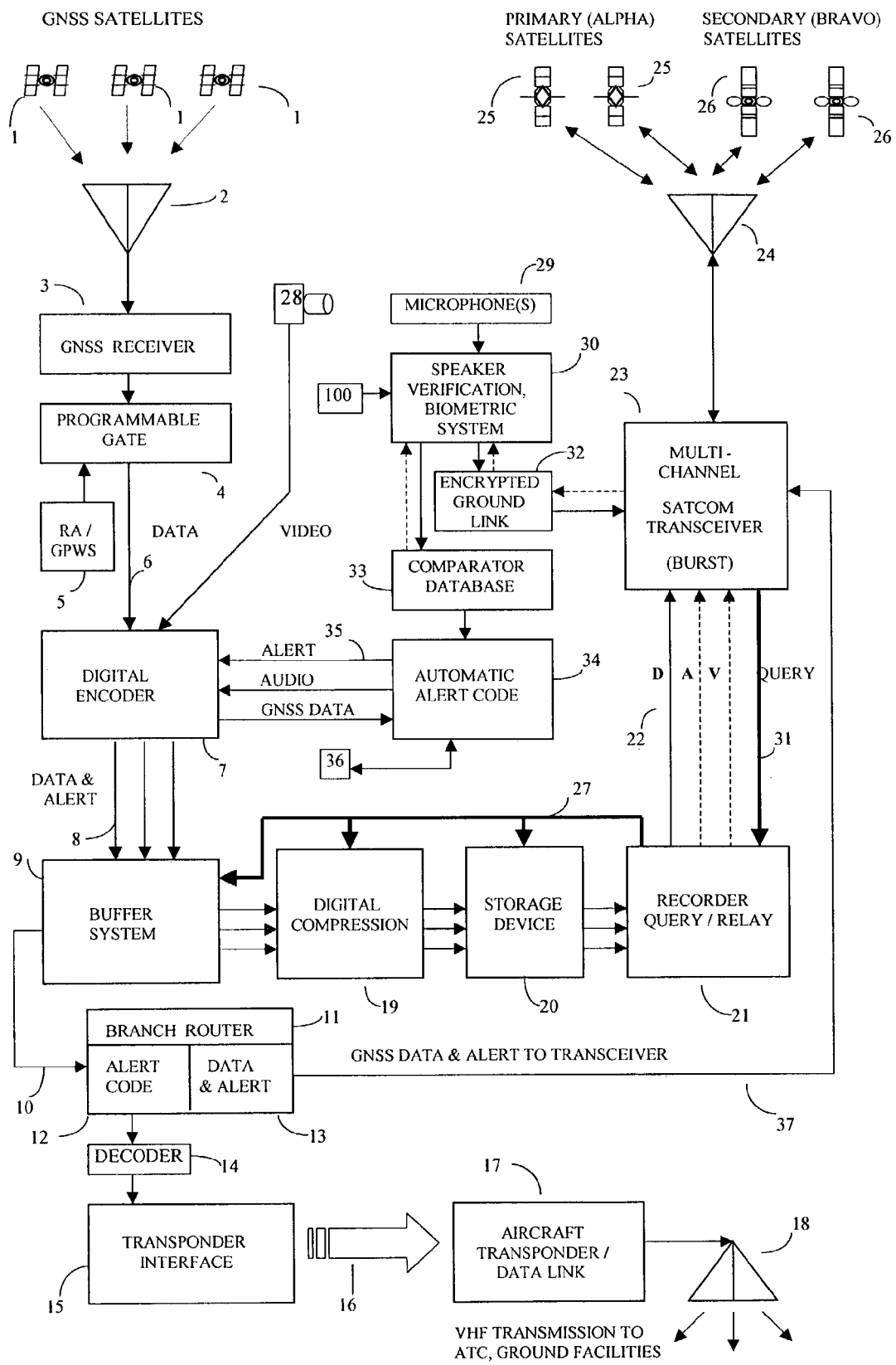
FIG. 2 is a block schematic drawing of the airborne element of the illustrated embodiment of present invention, detailing primary systems and sub-elements of the illustrated embodiment and inclusive wireless communication elements, FIGS. 3A and 3B, which may be collectively referred to as FIG. 3, is a block schematic diagram representing the flow and function of the ground based receiving center (Flight Data Receiving Center)

FIG. 2 depicts interrelated functions and sub-system elements of the AE. data collection, transfer and transmission constituents of the GNSS tracking sub-system are identified as follows; GNSS satellites 1, antenna 2 for receiving GPS/GLONASS or other positioning satellite signals, GNSS receiver 3, programmable gate 4, RA/GPWS (radar altimeter/ground position warning system) 5, multi-channel SatCom transceiver 23, antenna 24 and primary and secondary satellite system(s) 25, 26 through which signal is relayed to FDRC.

In the illustrated embodiment, GNSS receiver 3 is a separate receiver utilized to derive positional data of a moving or stationary body in which said receiver's location is calculated by acquiring geo-positional satellite signals through antenna 2, from GNSS satellites 1, sufficient to enable GNSS receiver 3 to calculate position in latitude, longitude and altitude.

Data produced by the GNSS receiver 3 includes time and positional coordinates and is incrementally sampled by the programmable gate 4, which regulates the rate at which positional data is transferred to remaining elements and sub-elements of the AE. This incremental rate, or sample rate, corresponds to an established rate, such as a range of one sample every two to five minutes. Each incremental sample is precisely timed, and limited to one positional location. This timing is derived from the GNSS satellite signals, in the form of, or which is converted to, a universal time unit of chronological measure, such as Greenwich Mean Time (GMT, UTC, ZULU) or equivalent. This time and derived or encoded date is paired with each incremental sampling of the GNSS receiver 3. AE system maintains a backup clock and power supply to assure continuity of operation.

Figure 3A:
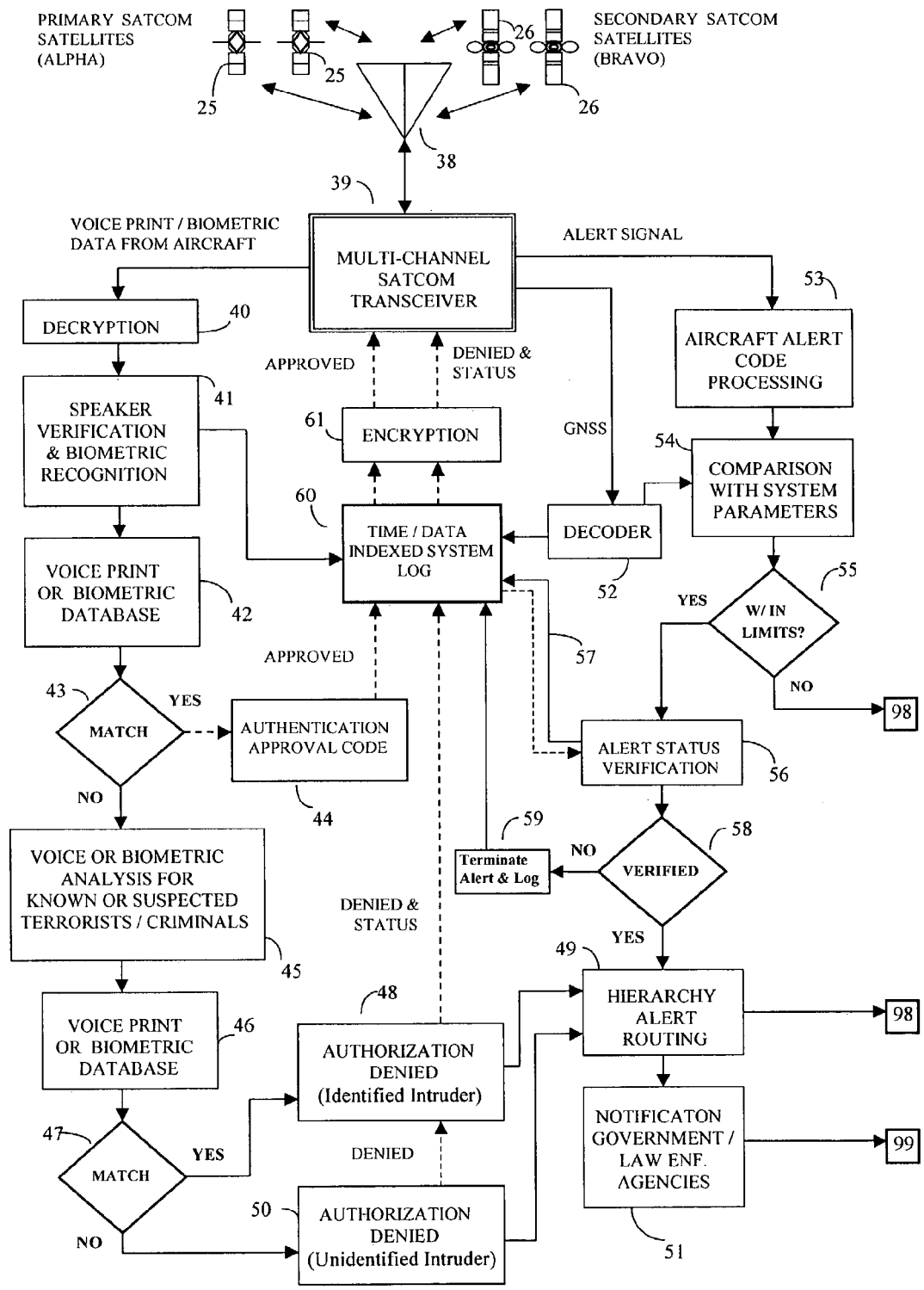
Figure 3B:
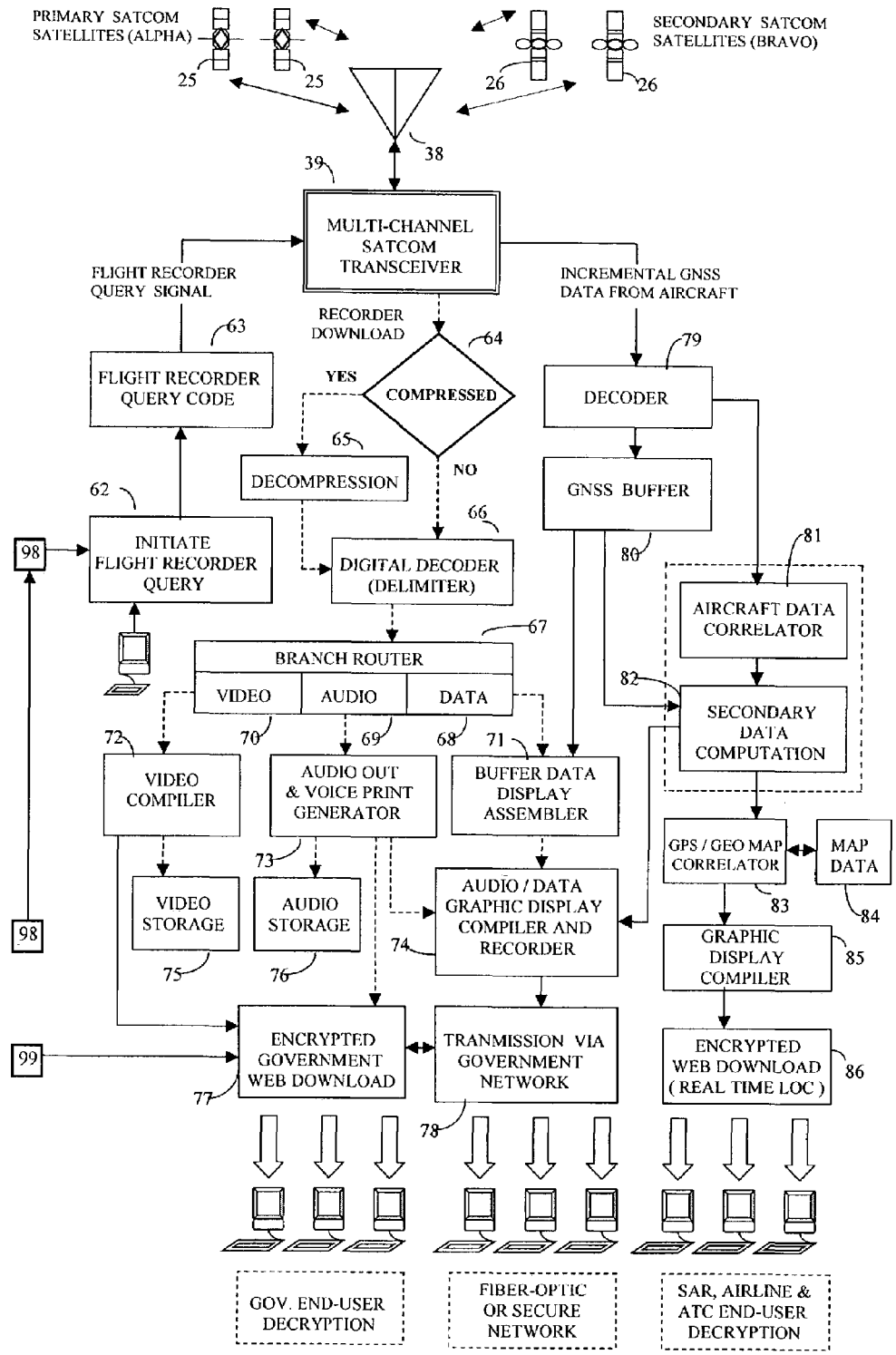
Figure 4A:
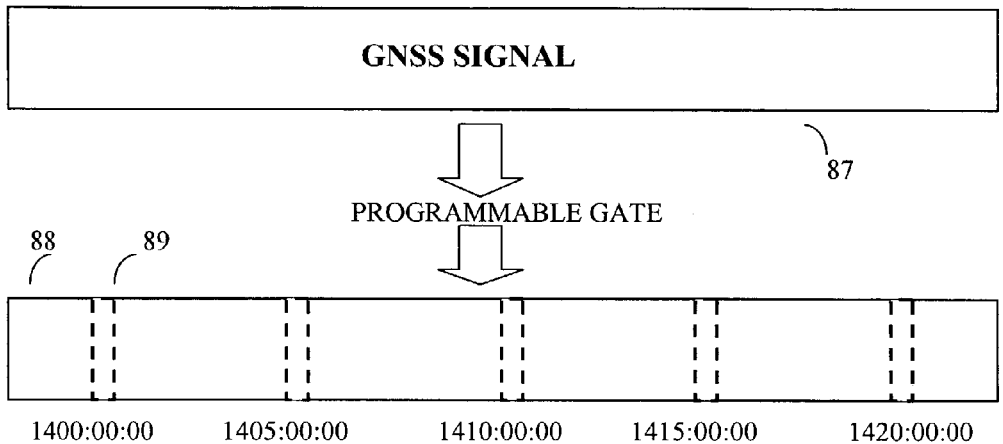
FIG. 4A illustrates the acquired GNSS positional signal and subsequent incremental sampling by the programmable gate, corresponding to singular geo-positional values per sample.

FIG. 4A illustrates the relationship between near-continual GNSS signal 87, as monitored by GNSS receiver (FIGS. 2, 3), and the subsequent processing by the programmable gate (FIGS. 2, 4) and the resulting incremental sample rate, as depicted in FIG. 4A, 88. The dashed-line segments demonstrate individual GNSS samples 89 and, by way of example, are labeled with military time in which each sample was taken i.e., 1400:00:00, 1405:00:00, 1410:00:00, etc. Each singular sample indicated by the corresponding vertical dashed line segment, contains date, time, latitude, longitude, altitude (ASL, and AGL if applicable).

Programmable gate (FIGS. 2, 4) incorporates means of adjusting sample rate, which governs GNSS data transfer to remaining elements of the sub-system. This sample rate is expressed as a number corresponding to the number of samples per hour. By way of illustration, a sample rate of once every five minutes equals an encoded sample rate of 12 samples per hour and a sample rate of once every 2 minutes equals an encoded sample rate of 30 samples per hour.

Certain features of the present invention make use of a contingent automatic increase of the sample rate, in response to AE position in relationship to the ground. It is understood GNSS systems may provide altitude above sea level (ASL); however this is not sufficient to determine proximity to terrain. For this reason, radar altimeter or ground position warning system (RA/GPWS) 5 is employed.

In the preferred embodiment, the Radar Altimeter/Ground Positioning Warning System (RA/GPWS) 5 signals the programmable gate 4 when AGL is at or below the decision height (DH), prompting the programmable gate 4 to substantially increase sample rate, thus providing more rapid indication to the FDRC of the AE's location. Additionally, it is the intent of the illustrated embodiment to derive accurate measurement of AGL from the RA/GPWS 5, at or below DH, and combine this data in a sequential linear timed transmission of data 6 to digital encoder 7, which delimits data by interspersing dividers or delimiters separating data into sets which may later be separated by FDRC into their original order and form. Although one of a number of delimiters may be selected, by way of illustration semicolons (;) are used to distinguish between separate elements of data, and commas (,) are used to distinguish between related elements of data. The resulting delimited data produced by the digital encoder 7, include the following data elements:

Aircraft identifier; date, time; sample rate; latitude, longitude; altitude above sea level; altitude above ground level; alert code (if applicable).

The order in which data elements are delimited and transmitted may differ from the order in which they are listed above, thus permitting coordinated syntax with other current systems or future technologies.

Figure 4B:
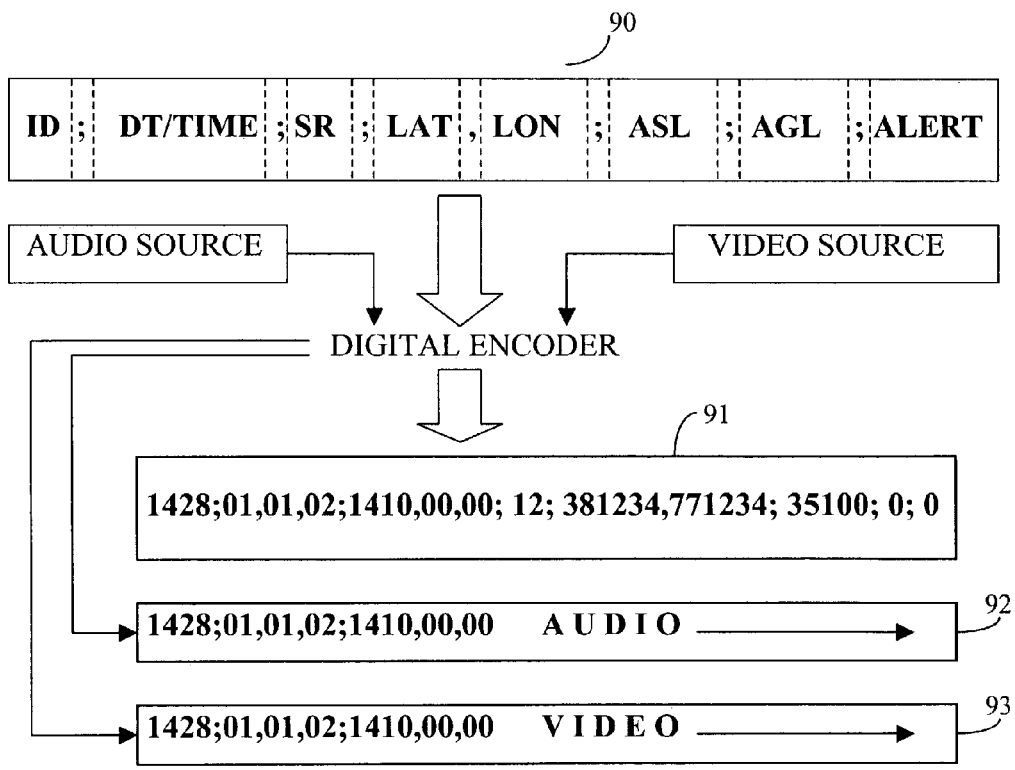
FIG. 4B illustrates varied forms of date/time-concurrently generated data which are subsequently delimited by the digital encoder and assembled into a linear sequential stream, demonstrates indexing of data to aircraft identifier, date and time, including separate channels of audio and video.

FIG. 4B demonstrates linear flow of separate indexed elements of data 90 to the digital encoder, along with separate channels of audio and video. The data elements identified in 90 are then delimited into a sequential predetermined order, indexed by the corresponding date and time in which the sample or individual elements of data were obtained. An illustration of the resulting delimited data stream is demonstrated in 91. Audio and video 92, 93 are processed separately.

Within the context of the described embodiment, it may be understood that the delimiter function of the present invention may also be capable of encrypting any or all elements of the data. This may be useful to eliminate chance of any adverse party receiving or interpreting portions of the transmitted data. Application of encryption capability and function is selected or defined at the discretion of the end user.

Certain contingent elements of data are not always present within the delimited data, such as AGL data. In the event RA/GPWS is above DH then the digital encoder records a zero, or other encoded marker in the space normally occupied by AGL data. This indicates no data is available, demonstrating the aircraft or commercial transport is above DH.

Once encoded, data is incrementally transferred through data-path 22 to multi-channel SatCom transceiver 23 and antenna 24, for immediate transmission at the set sample rate.

Resulting incremental GNSS signal is then transferred by primary and/or secondary SatCom satellites 25, 26 to FDRC (FIG. 3B), antenna 38, and multi-channel SatCom transceiver 39 to decoder 79. This block identifies and delineates data-related elements of the broadcast signal and removes delimiting markers separating various constituents of the data signal. All data, including positional coordinates, retain the corresponding aircraft identifier and date-time index markers contained within the original linear sequential assemblage of data. This permits constituent elements of data to be processed along separate data pathways, allowing the sum of those separate processing steps to be correlated with one another for computation of secondary data and subsequent display of a graphic depiction of the position of the aircraft at the indexed date and time.

Positional data, including latitude, longitude and altitude (ASL, AGL) are subsequently transferred from decoder 79 to GNSS buffer 80 which maintains a reference of the most recent historical path of each indexed aircraft, up to a defined or programmed number of positional samples or records. The GNSS buffer 80 maintains a buffer record of aircraft-specific positional data up to and including the maximum sample or record indicated. Since all records are identified by date-time markers, individual indexed buffer records include altitude data (ASL, AGL) permitting an inclusive reference for calculation and display of incremental positional changes and tendencies which may be expressed on a three dimensional basis.

The above described latitude, longitude and altitude data is transferred from decoder 79 to aircraft data correlator 81, allowing calculation of secondary data 82 including 1) compass heading, 2) distance traveled and 3) current speed. Calculation of secondary data is based upon the distance relational basis between two or more incrementally transmitted positional coordinates (latitude/longitude), and the time interval separating those coordinates. Algorithms used to calculate elements of secondary data include but are not limited to the examples listed below:

Compass-Heading Derived from Incremental Position Data

Because the most direct path between two points on earth follows a great circle, the following algorithm returns a compass heading when latitude and longitude coordinates are compared between two transmitted aircraft positions:

Definitions

LAT1, LON1—position of aircraft in degrees of latitude and longitude as determined by GNSS (GPS, GLONASS).

LAT2, LON2—secondary transmitted aircraft location in degrees latitude and longitude.

Mod—modulo operation. Returns remainder of division by argument, in this case $2*pi$ $PI=3.14159265$ ATAN—math function that returns arctangent of an argument.

HEAD=calculated heading from LAT1, LON1 to LAT2, LON2.

Algorithm 1

$$HEAD=mod(a\ tan((sin(LON1-LON2)*cos(LAT2))/(cos(LAT1)*sin(LAT2)-sin(LAT1)-sin(LAT2)*cos(LON1-LON2))),\ 2*pi)$$

Distance, Derived from Incremental Position Data

Definitions

LAT1, LON1—position of aircraft in degrees of latitude and longitude as determined by GNSS (GPS, GLONASS) readings.

LAT2, LON2—secondary transmitted aircraft location in degrees latitude and longitude.

DLON=LON2−LON1 (this is simply the difference between two longitudes)

DLAT=LAT2−LAT1

ANG=angle in radians between the two points as referenced from the center of the earth.

A=temporary variable

RAD=radius of the earth—varies with latitude from 3418.97368 nautical miles (NM) at the poles to 3452.84210 NM at the equator ALT1=altitude in feet above sea level (ASL) from aircraft ALT2=altitude ASL computed in nautical miles DIST=nautical miles (NM) between two points Algorithm 2

$$ALT2=ALT1/6080$$

$$DLON=LON2-LON1$$

$$DLAT=LAT2-LAT1$$

$$A=(sin(DLAT/2))^2+cos(LAT1)*cos(LAT2)*(sin(DLON/2))^2$$

$$ANG=2*a\ tan(sqrt(A)/sqrt(1-A))$$

$$DIST=(RAD+ALT2)*ANG$$

Current Aircraft Speed Derived from Incremental Position Data

The formula below returns airspeed in percentage of Mach (expressed as a decimal equivalent) and may be adjusted to calculate speed in miles per hour, knots or other unit of measure.

Definitions

SR=sample rate corresponding to time interval between transmitted coordinates contained in data transmission from aircraft.

DIST=distance in nautical miles (NM=6080 feet). This is the product of the distance algorithm, discussed earlier.

MACH=622.65789 NM/hr.

% MACH=percentage of Mach (decimal equivalent)

Algorithm 3

$$\%\ MACH=(DIST*SR)/622.65789$$

$$KNOTS=DIST*SR$$

Average Speed, Derived from GNSS Buffer Data

From the GNSS buffer 80, an accumulated record of sequential coordinates of the aircraft is obtained. Respective distances for each successive set of coordinates are calculated (81, 82) using the aforementioned distance algorithm and assigned corresponding identifiers DIST1, DIST2, DIST3, etc. By dividing the sum of DIST1, DIST2 and DIST3 by the number of distance values, an average is obtained. The resulting average is then multiplied by sample rate to return a value in knots, or divided by 622.65789 to obtain a value in AVG % MACH. The following algorithm may be applied to any number of derived positions.

Algorithm 4

$$\text{AVG \% MACH} = ((DIST1+DIST2+DIST3)/3)*SR/622.65789$$

$$\text{AVG KNOTS} = SR*(DIST1+DIST2+DIST3)/3$$

GNSS Aircraft Tracking Display

FDRC (FIG. 3B) processing of AE incrementally transmitted positional data includes sequential SatCom signal processing elements 38, 39, 79, 80 and 81. Aircraft and flight-specific data is accessed and transferred from the aircraft data correlator 81 and combined with secondary data computation 82 for individual referenced aircraft.

Precise positional data provides means of identifying the geographical domain of an aircraft in relationship to a corresponding map display. Geographic juxtaposition and graphic display of an aircraft's dynamic position relative to terrain is based on the following; Each map has an inclusive range of latitude and longitude positions corresponding to its geographic bounds, or geographic domain. Map correlator 83 obtains current AE position, determines geographic domain in which the AE's current position is included and then calls up the corresponding base map from map data 84 interposing a graphic symbol corresponding to the aircraft's latitude and secondarily calculated course heading and speed. Historical path of a displayed aircraft may be displayed as a line or tail behind the aircraft's current geographic position. Sequential positions of an aircraft's historical path are indexed in GNSS buffer (FIG. 3B, 80), and may be useful in determining precise course and any applicable deviation.

Figure 9:
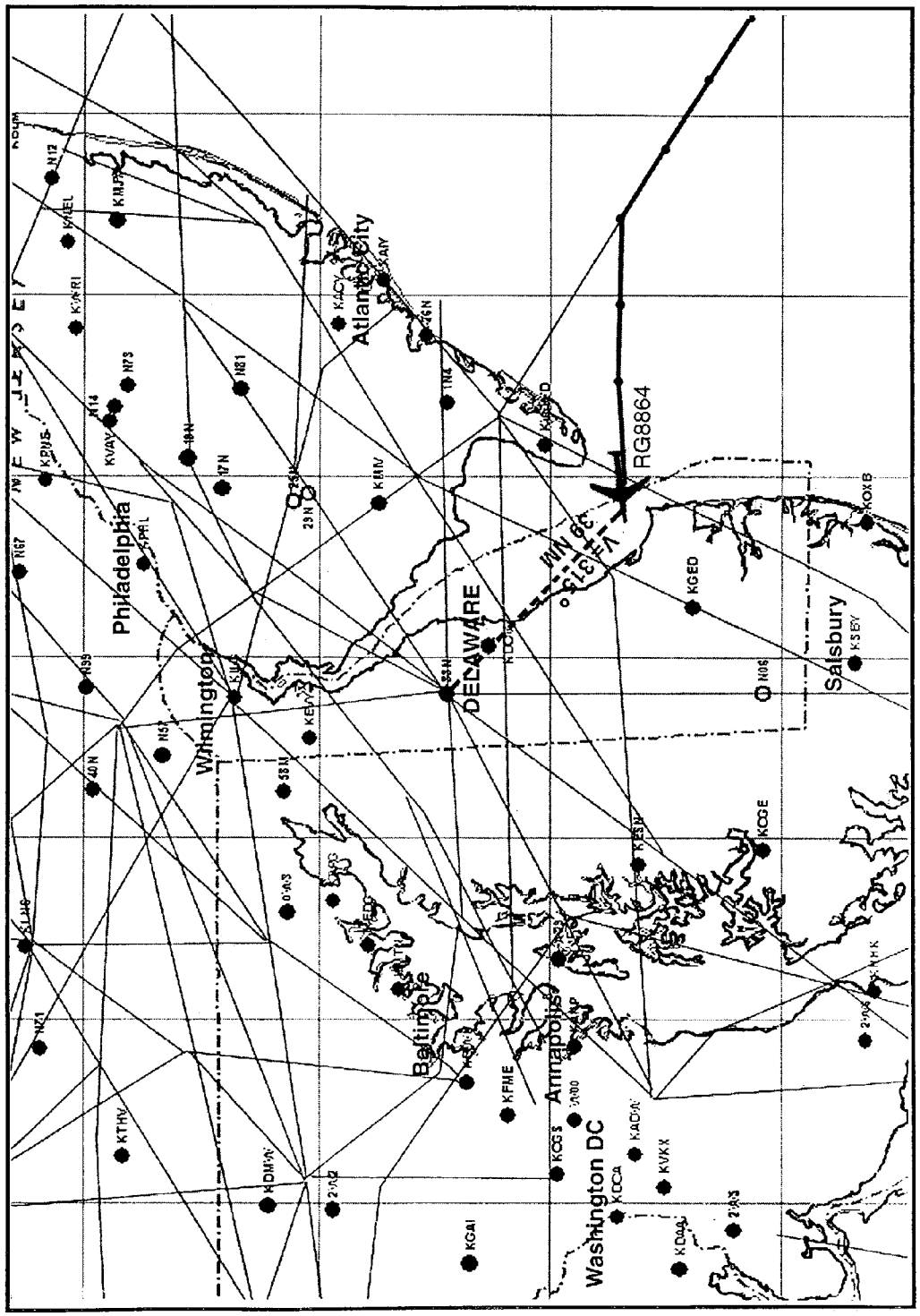
FIG. 9 is a graphic map display indicating the current dynamic positional aspect of an aircraft and its relationship to a correlated map corresponding to the geographic domain of the equipped aircraft, and displays additional aircraft-specific data and vector line aspects of the illustrated embodiment of the present invention.

FIG. 9 illustrates a correlated display, of the representative dynamic path of an aircraft's forward progression in relationship to its geographic surroundings. In this example, an aircraft, VARIG (RG Flight 8864 from Sao Paulo, Brazil (GRU airport code) to New York (JFK), is approaching the eastern seaboard below Atlantic City at 6:47 A.M.

Display of the aircraft's historical path is demonstrated in FIG. 9 by a line or tail behind the aircraft, showing its prior transmitted positional coordinates. This provides precise means of identifying an aircraft's current relationship to geographic identifiers as well as calling attention to positional changes and substantial deviations over time. Some current surveillance methods correlate positional data in relationship to aircraft transmitted course intent, or ATC displayed navigational lines, but fail to adequately identify precise path of travel of a given aircraft totally independent of anticipated navigational lines or parameters.

In the illustrated embodiment of the present invention, referenced maps and inclusion of certain graphic elements are available as individual layers permitting user-selectable graphic features to be displayed or omitted. In this manner, ATC or ground personnel may "toggle" between existing navigational line screens and correlated geographic displays, indicating the aircraft's relationship to terrain, buildings or geographic identifiers. The individually selectable display layers may include, but are not limited to, cities; transportation routes and highways; primary and secondary airports; high-low aircraft navigational lines; controlled spaces; governmental buildings and landmarks; military or coast guard bases; search & rescue facilities.

Aircraft within a given geographic domain may be displayed singly, as need dictates, or a display may be called up to depict all aircraft within a given airspace or region, or to display all aircraft corresponding to a particular airline or entity. Detailed data may be displayed for selected aircraft.

Automatic Vector Line and Display

Vector line aspect of the illustrated embodiment provides a selectable means of calculating and displaying one or more lines from the dynamically advancing position of the displayed aircraft to the user selected locality or nearest primary and/or alternate airport(s). Stored latitude and longitude data of the fixed location of these airport(s) permit comparison and calculation of positional differences between the dynamic path of the aircraft and the stored reference coordinates. FDRC system first identifies the user selected or nearest viable airport relative to the aircraft, displaying a vector line and calculated compass heading and nautical miles from the aircraft to the fixed-point position of the selected airport. Displayed vector line, compass heading and distances are continually re-calculated and graphically updated as the dynamic position of the selected aircraft changes.

FIG. 9 provides an example of the graphic display of the automatic vector line. In this example, VARIG Airlines (RG) encounters problems and deviates from its course by 30 degrees. Automatic calculation of the vector line indicates an alternate airport northwest of Dover, Del., where this aircraft may land. The vector line display includes compass heading of 315 degrees, with corresponding distance of 39 nautical miles. The vector line in this example is displayed as a dashed-line, and is continually recalculated in relationship to the aircraft's dynamic change of position.

Calculation of compass heading from aircraft to fixed-point location is identical to the compass heading algorithm (previously described).

Distance calculation between the aircraft and the fixed-point location may be calculated using a haversine algorithm enabling data to be computed in nautical miles.

Definitions

LAT1, LON1—position of aircraft in degrees latitude and longitude as determined by GPS readings.

LAT2, LON2—position of fixed-point location in degrees latitude and longitude as determined from data base.

DLON=LON2−LON1

DLAT=LAT2−LAT 1

ANG=is the angle in radians between the two points as referenced from the center of the earth.

A=temporary variable

RAD=radius of the Earth. Varies between 3418.97368 NM at the poles to 3452.8421 NM at the equator.

DIST=nautical miles (NM) between two points

Algorithm $$DLON=LON2-LON1$$

$$DLAT=LAT1-LAT2$$

$$A=(\sin(DLAT/2))^2+\cos(LAT1)*\cos(LAT2*(\sin(DLON/2))^2$$

$$ANG=2*a\tan(\text{sqrt}(A)/\text{sqrt}(1-A))$$

$$DIST=RAD*ANG$$

Aircraft surveillance and tracking aspect of the illustrated embodiment differs from competing systems in the following manner: ADS and FANS CNS/ATM may primarily rely upon transmission of aircraft position in relationship to stated course intent or existing navigational lines, and therefore a lesser degree of accuracy with extreme deviation from course-heading or navigational lines as indicated in the catastrophic events of Sep. 11, 2001. Additionally, ADS, ADS-B, FANS CNS/ATM and other systems transmit coordinates including latitude, longitude, airspeed, course heading and (course) intent. The illustrated embodiment of the present invention permits the FDRC to accurately calculate secondary data from primary data transmitted by AE. This secondary data includes compass heading, distance, current speed, average speed and any deviation from incremental transmission of latitude, longitude and altitude.

FIG. 9 provides an example of a CRT display screen and indicates precise location of an aircraft in relationship to its geographic surroundings. Terrain, cities and waterways are identified, as well as aircraft navigational lines. Although existing ATC system displays indicate an aircraft's location in relationship to high-low navigational lines, the illustrated embodiment of the present invention provides an accurate means of correlating an aircraft's precise position in relationship to landmarks and precise geographical identifiers.

FIG. 9 likewise depicts the historical path of the displayed aircraft, appearing as a line or tail behind the aircraft. The incremental dots on this line are offered for illustration purposes, indicating sequential positions corresponding to the aircraft's successive transmitted coordinates. The distances between these dots are strictly for purposes of illustration.

FIG. 9 also provides visual representation of a vector-line display, indicating automatic display of course heading and distance from an aircraft to the nearest viable primary or secondary airport. This feature is selectable.

Common Alert Code Communication Elements

Multi-path communication redundancy aspect of the AE (FIG. 2) decreases risk of system compromise while increasing means of immediate communication of aircraft-specific alerts to FDRC and ATC. Primary communication is initiated through inclusive SatCom communication elements, including two or more satellite constellations sufficient for global coverage, depending upon the coverage of each respective constellation. In FIG. 2, this is illustrated by primary (alpha) satellites 25 and secondary (bravo) satellites 26. Transmission of AE alert codes, in this manner, are directed to the FDRC.

Secondary means of transmission of alert signals are initiated through inclusive transponder/data link communication elements of the AE, with ATC (or other designated ground facility) as the resulting signal destination.

Elements of each of the respective parallel communication systems are as follows:

SATCOM communication elements relative to GNSS positional data and alert signals include alert 35, to digital encoder 7, where the alert signal is delimited, then data & alert 8 through buffer system 9 and data path 10, to branch router 11, data & alert 13 channel, and GNSS & alert to transceiver 37 data-path, to multi-channel Satcom transceiver 23, antenna 24 and Satcom satellites 25 and/or 26;

Transponder/data link elements include initiation of condition-contingent alert signal, (alert 35), which is delimited in digital encoder 7, and passed through data path, (data & alert 8) to buffer system 9 and data path 10 to branch router 11, alert code 12 channel, to decoder 14 and transponder interface 15, approved system connector represented by arrow 16, to aircraft transponder/data link 17, antenna 18 with resulting RF transmission to ATC receiving center(s).

Alert codes are initiated by either AE or FDRC elements, with the latter of these signifying a response to conditional changes or absence of the incrementally transmitted AE positional coordinates. The differences are described below:

Automatic Alert Code Generation

In the context of the illustrated embodiment, AE transmission of alert codes to FDRC, ATC is contingent upon requisite factors and conditional parameters on board the aircraft relative to specific alert codes. The preferred embodiment identifies, but is not limited to, the following codes:

Code 7500 corresponds to AE detected intrusion within the cockpit or other controlled space, including detection of unrecognized biometric characteristics within the controlled space. Detailed discussion of the contingent aspects of this alert code is contained within the section pertaining to biometric monitoring. Within the context of the present invention, additional transmitted alert codes may be possible, commensurate with other detected or signaled emergencies, including, but not limited to, signaled incidents or passenger disturbances occurring within the cabin, lavatories or flight-crew stations, and detected aircraft baggage compartment problems or anomalies.

Code 7600 pertains to AE (FIG. 2) detected deviation from course or navigational parameters, which exceed programmed or established threshold values contained within reference storage device 36. These threshold values may contain alteration of course heading beyond a set degree value, or it may signal a Code 7600 alert if the aircraft approaches or attempts to intrude upon certain controlled space, such as those around national landmarks or military installations.

Code 7700 references FDRC detected absence of incremental positional transmission by an aircraft (AE). FDRC (FIG. 3A) monitors incremental. GNSS transmissions of each indexed operational aircraft. Signals received by multi-channel Satcom transceiver 39, are transferred to decoder 52 and time/data indexed system log 60. Comparison with system parameters 54, monitors the incremental GNSS transmissions, and determines any lapse of transmissions. If this occurs, verification is sought through 55, 56, 57, 60, 58. If this verification process fails to confirm Code 7700, the decision diamond transfers signal to terminate alert & log 59. If the signal is confirmed, an automatic download of the particular AE flight recorder is initiated through link [98], with corresponding FIG. 3B links 62, 63, 39, 38 and 25 and/or 26. Concurrently if AE alert (FIG. 3A) is confirmed, hierarchy alert routing 49 transfers the Code 7700 alert to notification government/law enforcement agencies 51, with link [99] to FIG. 3B, numbers 77 and 78.

Code 7800 permits advance transmission of an alert, upon AE determination of inevitability of controlled or uncontrolled flight into terrain. This alert code corresponds to projected net terminal location (NTL).

Automatic Reverse Vector Line Display

Rescue and recovery operations have been severely hampered by inability of present technology to identify location of a known or assumed aircraft crash site. Radar and other systems provide approximation of an aircraft's location based upon time and distance relationship of reflected or transmitted signal from the aircraft. From this, approximations may be made that are less accurate if an aircraft deviates from a given navigational course or is outside the range of coverage.

Existing aircraft ELTs are limited by functional reliability of the crash activation sensor or G-switch to detect a crash or predicate event. Even if activated, ELTs function as transmitted locational beacons, rather than the present invention, which calculates and transmits crash-site geographic coordinates.

One event illustrating limitations of current locational systems and technologies: on Jan. 31, 2000, Alaska Airlines Flight 261 to Seattle crashed off the coast of Northern California, 10 miles from Port Huenembe. Despite duration the plane was airborne prior to the crash, and close proximity of crash site to the shore, considerable time was taken to locate the crash site.

The illustrated embodiment of the present invention provides means of tracking and displaying an aircraft's geographic position in relationship to terrain or oceanic localities. Additionally, the present invention may enable airborne monitoring of relational trajectory with advance determination of the geo-specific location of an imminent intersection of aircraft and terrain. Transmission of AE alert code (7800) and projected net terminal location (NTL) coordinates is initiated while the aircraft is still airborne, and is directed to the nearest Search and Rescue (SAR) or response facilities. This alert prompts corresponding ground-based graphic display of a geographically-indexed reverse vector line from SAR location(s) back to the aircraft in addition to calculated latitude, longitude, altitude, compass heading, and nautical miles to the projected aircraft NTL. Automatic alert notification will typically be directed to the SAR locations nearest the NTL. This permits rapid deployment of SAR personnel, greatly enhancing rescue efforts and assisting recovery of aircraft for later reconstruction of events leading to incident or crash.

Operation is as Follows:

Referring to FIG. 2, upon dropping below decision height (DH) set by the radar altimeter/ground proximity warning system 5, RA/GPWS 5 signals the programmable gate 4 to substantially increase sample rate of GNSS receiver 3, and correspondingly decreasing the time-separation between transmitted positional data back to the FDRC.

Figure 11:
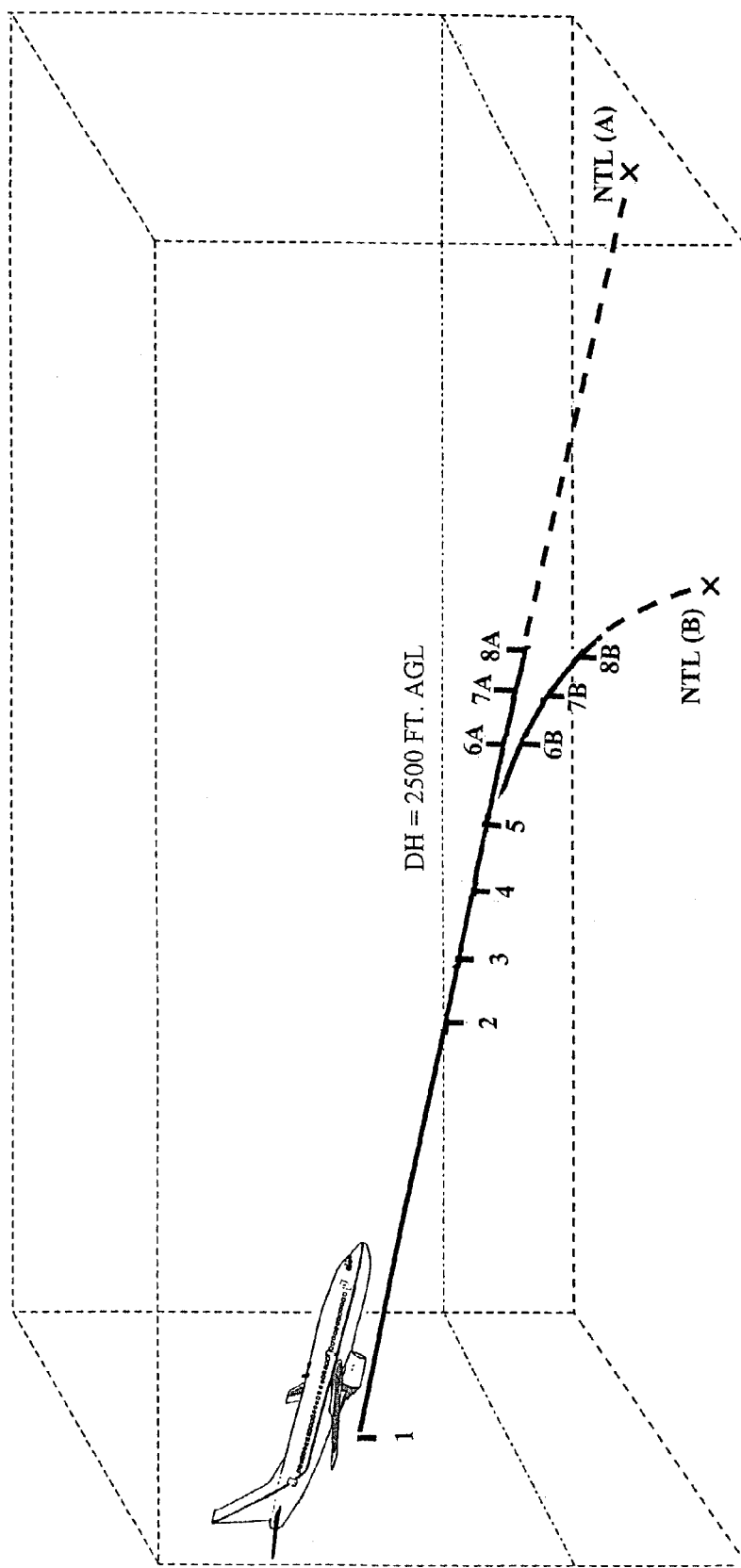
FIG. 11 is a graphic illustration of the descent of an aircraft above and below decision height (DH) set by radar altimeter/ground proximity warning system and corresponding change to sample rate regulated by the programmable gate, and illustrates calculation of NTL from the last transmitted positional coordinates.

FIG. 11. illustrates the descent of an aircraft, approaching DH (usually about 2,500 ft. AGL). Above DH, the incremental separation between SR established by the programmable gate (FIGS. 2, 4) is much greater, representing a longer corresponding distance traveled by the aircraft between successive incremental transmissions. This longer duration is depicted in the distance separating (FIGS. 11) 1 and 2. Successive numbers 2, 3, 4 and 5 illustrate an increase in SR below DH. This increase of SR by AE coupled with existing ASL altitude and RA/GPWS 5 derived AGL altitude, provides more frequent data from which the aircraft's glide path and trajectory may be determined on a three-dimensional basis, in relationship to the terrain below.

The process of calculating aircraft NTL from three-dimensional trajectory is illustrated in alternate paths, "A" and "B" (FIGS. 11, 6A, 7A, 8A; 6B, 7B, 8B) which produce differing locational projections for the aircraft, NTL(A), NTL(B), depending upon current and preceding path of said aircraft. Continual AE analysis of the aircraft's dynamic path includes; AGL altitude, glide path, trajectory, speed, distance and time relative to probability of aircraft trajectory intersecting underlying terrain or geographic feature(s). Upon AE determination of probable trajectory commensurate with projected intersection of aircraft and terrain, further analysis determines validity of a potential alert.

(FIG. 2) Automatic alert code 34 block examines trajectory against operational parameters stored in a system addressable data base 36. Projected dynamic path of the aircraft is weighed against normal navigational changes commensurate with course correction or landing procedures. If such factors are present, then potential NTL alert is cancelled. Additionally, if trajectory is outside normal navigational parameters, then AE determines distance and time to projected NTL event, and whether aircraft control surface settings may correct the projected event. Aircraft trajectory is then monitored to determine whether corrective action is taken. In the event control settings or action are deemed insufficient to negate controlled or uncontrolled flight into terrain, then calculated point of aircraft's intersection with terrain is used to project latitude, longitude and altitude of the aircraft's NTL. The resulting automatic alert code 34 (Code 7800) is then generated and transmitted to the FDRC through inclusive elements of the SatCom communications link.

Referring to FIGS. 3A and 3B, upon FDRC receiving AE transmitted alert code, rapid verification process is completed as follows: Aircraft alert code processing 53 interprets the alert code and passes it to comparison with system parameters block 54, which analyzes origination of the alert in relationship to stored parameters. The decision diamond 55 returns a NO if AE transmitted alert does not exceed system parameters or thresholds. This connects (through link [98]) to initiate flight recorder query 62 and transmission of query code 63 through the SatCom link to the AE. This correspondingly prompts AE transmission of compressed audio and data portions of the flight recorder in LIFO from AE back to the FDRC. If decision diamond 55 determines alert does exceed limits of system parameters block 54, a YES is returned, initiating alert status verification 56, which verifies coded alert against time/data indexed system log 60. Secondary decision diamond 58 correspondingly determines whether alert is verified. Return of a NO results in terminate alert & log 59, with recording of such action within time/data indexed system log 60. If decision diamond 58 returns a YES, (alert is verified) then signal is passed to hierarchy alert routing 49 and connecting link [98] to initiate flight recorder query 62 and flight recorder query code 63 through inclusive elements of the SatCom link, to AE; prompting immediate compressed LIFO satellite transmission of flight recorder contents back to the FDRC. Notification of SAR response facilities proximal to the aircraft is initiated upon confirmation of AE transmitted alert. Additionally, hierarchy alert routing (FIG. 3A, 49) acts upon selected protocol for notification of government/law enforcement agencies 51, with relay of alert through link [99] to corresponding element of FIG. 3B to encrypted government web download 77.

Constituent aspects of the referenced AE alert signal include an encoded alert element (Code 7800) and a corresponding data element, which includes integral aircraft ID, date, time and locational index of transmission, as well as geo-specific LRC and NTL coordinates. Parsed data portion of the aircraft alert is transferred from SatCom transceiver (FIG. 3B, 39) through decision diamond 64 and contingent decompression 65, digital decoder 66 to branch router 67. The data channel 68 of the branch router 67, passes current indexed positional data to buffer data display assembler 71 and calls up historical data on the incremental path of the identified aircraft from GNSS buffer 80. Aircraft-specific data is received from aircraft data correlator 81 and GNSS buffer 80, and transferred to secondary data computation 82 where calculations determine relational nature of LRC and NTL within a given geographic domain.

Secondary data computation 82 identifies the fixed latitude and longitude point of the nearest SAR base or response facilities. Calculation of distance separating aircraft NTL from the singular or multiple fixed-point location(s) is completed using the previously disclosed distance algorithm, which calculates distance in nautical miles between the two points.

Compass heading is determined by previously referenced algorithm, from which 180 degrees is subtracted from HEAD (heading). This returns a value equal to the reverse heading from airport to NTL (in degrees).

GEO map correlator 83 then determines geographic domain of the NTL and retrieves the identified map from map data 84. Graphic display compiler 85 combines aircraft icon and map and generates a reverse vector line, graphically displaying coordinates and a line from the nearest SAR base(s) back to the aircraft's NTL.

Figure 10:
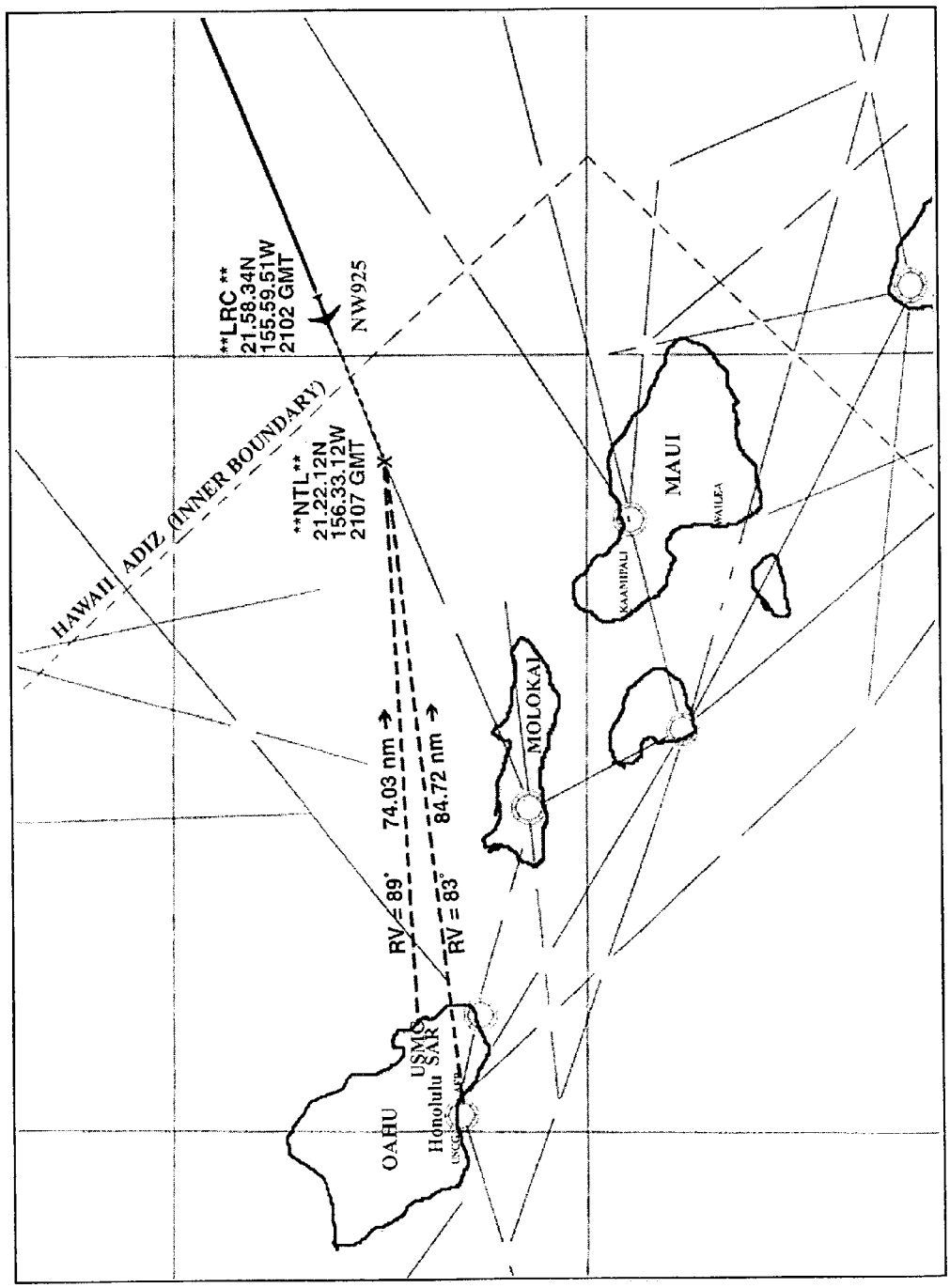
FIG. 10 is a graphic map display illustrating calculation and display of net terminal location (NTL) and reverse automatic reverse vector-line.

FIG. 10 presents an example of a CRT screen graphically displaying last reported coordinates (LRC) and projected net terminal location (NTL), of an aircraft near Hawaii, with reverse vector line from the two nearest SAR bases back to the aircraft. This CRT screen illustrates detailed data incorporated into the display, which facilitate rapid and precise location of an aircraft by responding personnel. This data includes latitude, longitude and altitude of the net terminal location, nautical miles and compass heading in degrees. In the preferred embodiment, the display generated aircraft icon, LRC, NTL and reverse vector line are caused to flash to alert SAR and regional ATC of the incident. Display of the composite map is immediately transmitted through encrypted web download 86 to SAR, Airline & ATC End-Users where the image and data are automatically decrypted.

Additionally, Code 7800 (NTL) may also be generated by the FDRC in response to cessation of regular incremental positional signal(s) from the aircraft (AE). In this instance, FDRC determines whether the last reported coordinates (LRC) indicate an AGL below DH, and if so, proximity to terrain, relative to determination whether the aircraft may have been subject to a controlled or uncontrolled flight into terrain, and any commensurate calculation of NTL geographic coordinates with subsequent notification of SAR personnel. In this manner, the FDRC is able to detect an NTL event that has been missed by the AE.

Biometric Control Sub-System

The illustrated embodiment of the present invention employs a system and means for consistent analysis of intrinsic biometric features of a person seeking admission to a flight deck or other controlled space of the aircraft, while protecting against system compromise. Although the present invention specifies speaker verification as the preferred technology, additional or substitute biometric sensors (FIG. 2, 100) or methods may be employed within, or without the flight deck.

Within the context of the preferred embodiment, a means is identified in which concurrent biometric analysis is conducted between two parallel systems (AE and FDRC), substantially reducing risk of error, while protecting against compromise of either biometric system element.

The sequential or non-sequential processes, functions and tasks of the biometric control sub-system may comprise elements of hardware, software or any combination thereof.

In the preferred embodiment, speaker verification is indicated as the selected means of biometric authentication. The term speaker verification refers to identification and analysis of intrinsic characteristics of an individual's speech or verbal utterances against a stored record of a known/authorized person's speech, including but not limited to feature extraction method of text-dependent speaker verification.

Additionally, the preferred embodiment utilizes text-dependent aspect of speaker verification for initial data index record retrieval and text-dependent aspect for authentication of certain elements of the log-on's verbal response to AE prompted password sequence against a reference database of extracted characteristics of a known-individual's speech.

Certain text-dependent speaker verification systems employ pass-phrase sequence randomization with audible or textual prompt to enunciate precise biometric system selected words and numbers for authentication of the person seeking admission to, or permission to operate within, the controlled area. This random selection of words and numbers, which comprise a log-on sequence, protects against system compromise by a tape-recorded voice. Existing technology enables delineating acoustic produced human utterances from electronic, digital or mechanical reproductions, thus adding additional assurance against system compromise. Equally important, is the ability to recognize differences between acoustic utterances and electronic, digital or mechanical emulations of the human voice, enabling an embodiment of the present invention to distinguish between human utterances within the area of the flight deck and background sounds such as; aircraft radio, intercom or automated verbal warnings such as those produced by T-CAS, ADS-B or Ground Proximity Warning Systems.

Competing biometric technologies, such as thumb-print identification, retinal or iris scan systems are subject to compromise by an intruder removing corresponding portions of an authorized person's anatomy in relationship to that competing biometric method. Speaker verification is not prone to such compromise, since acoustic speech may not be separated from an authorized person. Additionally, the preferred embodiment of the present invention employs voice-stress analysis to alert ground-based personnel if a person's responses are under duress. This is accomplished through frequency-shift analysis, which detects a consistent shift of speech to higher frequencies if a person is under induced stress.

Referring to FIG. 2, components of the biometric security and monitoring system include at least one microphone 29 located within the vicinity of flight deck or space for which access control is sought. In the preferred embodiment, several microphones are placed around the flight deck or controlled space, sufficient to detect any acoustic or other sounds within the controlled space. Use of existing headset microphones permits personnel to sequentially log onto the biometric system without passengers or crew overhearing details of the biometric security process.

The speaker verification biometric system 30 represents the central CPU element of the speaker verification system. Functional aspects of this block include initiation of log-on sequence, issuance of log-on prompts, and analysis of verbal responses to the authentication process.

Personnel submit to the authentication process in sequential order. Within the preferred embodiment, the highest ranking officer or employee would state into the microphone or headset, "LOG-ON". The CPU of the speaker verification biometric system 30 would then initiate an encrypted ground link 32 through the inclusive elements of the SatCom link to the FDRC. Once connected, parallel AE and FDRC biometric system elements concurrently analyze and process verbal responses to specific AE initiated prompts.

Speaker verification biometric system 30 then responds and prompts the enrolling officer or employee, "STATE NAME" the responding individual would then state his/her rank or position title and name, such as: "Captain, John R. Michaels."

Parallel AE and FDRC processing of verbalized (spoken) text-dependent rank/position and name is used as a data index for retrieval of corresponding memory elements in FIG. 2, 33 and FIG. 3A, 42, where known voice characteristics are stored corresponding to that individual.

Speaker verification biometric system (FIG. 2, 30) and comparator database 33 process verbal response of the officer/employee's rank/position and name log-on against stored voice characteristics of the same verbal sequence, corresponding to the known authorized individual. Concurrently, FDRC (FIG. 3A), upon decryption 40 of AE transmitted log-on responses, the speaker verification and biometric recognition 41, voice print or biometric database 42 and decision diamond 43, process the verbal response in corresponding fashion. Both AE and FDRC processes are parallel and concurrent, yet independent in their comparison of verbal sequences against their respective known databases.

Analysis and concurrent comparison by AE and FDRC of the verbal response is possible within one or more seconds. Concurring approval by AE and FDRC regarding authenticity of log-on verbal sequence queues the AE system to generate and prompt the enrolling Officer or employee to recite AE selected random sequence of words and numbers, as in the example below:

"Repeat in sequence: Zulu, Azimuth, Bogie, Fife, Indigo, Thirty three"

with verbal response:

"Zulu, Azimuth, Bogie, Fife, Indigo, Thirty three"

Parallel AE (FIG. 2, numbers 30, 33) and FDRC (FIG. 3A, numbers 41, 42, 43) then process and compare extracted elements of speech with the previously referenced speech characteristics of the known-authorized individual. Additional processing through 45, 46 and 47 occurs in the event extracted elements of the log-on's voice fail to match the known speech samples of voice print or biometric database 42.

Authentication of any officer/employee seeking access to the flight deck or other controlled space is contingent upon concurring approval by AE and FDRC parallel biometric systems. A concurring approval is called a Double-Go.

If either the AE or FDRC (FIG. 3A, 48, 50) fails to authenticate an individual (Go and No-Go) then authentication is denied. As long as one system authenticates, then speaker verification biometric system FIG. 2, 30, immediately generates a second prompt with a different log-on sequence. The officer/employee's confirming log-on, is sufficient to clear any remote possibility of conflicting elements of extracted speech producing false-rejection from the initial speaker verification log-on.

Upon confirmation of the log-on voice authenticity, authorization approval code 44 is logged 60, encrypted 61 and transmitted by SatCom link back to the parallel AE biometric system. If AE and FDRC biometric elements concur on authenticity of the log-on verbal sequence, then approval is indicated by audible tone through the headset or system speaker, and the next officer/employee states "LOG-ON" into their headset or microphone, and the previously described process is repeated. All officers/employees seeking authorization for the flight deck or other controlled space must receive confirmation prior to take-off or other initiated event for which clearance is sought.

Upon concurrent AE and FDRC approval of all flight crew or personnel operating within a given controlled space, all biometric system changes are locked-out, indicating that no changes are permitted to the logged record of authorized personnel until the aircraft reaches its final destination. This lock-out serves as basis for the biometric monitoring sub-system element of the present invention.

Indexed record of the approved personnel is maintained in secured temporary memory of the AE (FIG. 2) speaker verification biometric system 30, as well as logged in FDRC (FIG. 3A) time/data indexed system log 60. AE record is used to exclude non-authorized personnel from the controlled space and provide basis for reference by biometric Monitoring sub-system.

If, however, both AE and FDRC decline authorization of an officer/employee, then AE (FIG. 2) automatic alert code 34 is generated 35 (Code 7500) and is forwarded through inclusive SatCom link elements to FDRC where automatic verification is initiated of log-on and alert code process (FIG. 3A numbers 53, 54, 55, 56, 57, 58, 59, 60). If this verification process indicates an error, the automatic alert is immediately cancelled. If, however, the alert is confirmed then hierarchy alert routing 49 identifies and initiates contact with appropriate governmental agencies (FIG. 3A 51, link [99]; FIG. 3B 77 to government end-user decryption).

Subsequent FDRC (FIG. 3A) contingent processes initiate a link from hierarchy alert routing 49 (through link [98]) to initiate flight recorder query (FIG. 3B, 62), flight recorder query code 63, multi-channel SatCom transceiver 39, and subsequent inclusive SatCom communications link to the AE, where flight-recorder download to SatCom link is initiated from AE (FIG. 2), digital compression 19 in LIFO format.

Acoustic Monitoring Sub-System

Following voice-biometric authentication of all authorized personnel the acoustic monitoring sub-system continually monitors all sounds within confines of flight deck or other controlled space. This audio monitoring includes all verbal and acoustic utterances originating in the cockpit or controlled space as delineated from automated cockpit voice alerts or incoming radio or intercom communication.

Elements of the acoustic monitoring sub-system are depicted in FIG. 2 and include one or more inconspicuously mounted microphones 29 sufficient to detect all ambient sounds within confines of the flight deck or controlled space of the aircraft.

Speaker verification biometric system 30, comparator database 33, automatic alert code 34 the latter of which comprises means of initiating specified alert code(s) contingent upon specific prerequisite conditions. Any resulting alert code (if applicable) is identified by signal path marked ALERT 35.

Digital encoder 7 receives and delimits ALERT 35, which is indexed to date, time and positional data. The relational nature of alert codes to these identifiers permit reconstruction of events preceding and subsequent to any applicable alert.

Flight recorder sub-system elements 9, 19 and 20 and communication related elements 21 and 23 process and record accumulated data including alert codes separately or in addition to audio and/or video (dashed-line data paths, "A" and "V"). Operation of the flight recorder sub-system is independent in operation but ancillary to the function and processing of all AE systems, such as acoustic monitoring, recording of audio, video and alert codes corresponding to detected anomalies.

Continual monitoring of acoustic, ambient environment of the flight deck or controlled space is sufficient to detect any voices, utterances or acoustic sounds and compare them against logged voices of authorized personnel stored in the comparator database 33 and secure temporary memory element of the speaker verification biometric system 30.

The secure temporary memory maintains reference of intrinsic characteristics of authorized personnel operating within the cockpit or controlled space, and provides means of detecting any differing voice or utterance. This temporary record is maintained for the duration of the flight and is deleted upon successful biometric authorization of replacement personnel. Duration of acoustic monitoring is continual until conclusion of the flight, with biometric system log off by the current crew.

In addition to record of individual intrinsic elements of speech, particular to personnel authorized to occupy the flight deck or controlled space, the comparator database 33 also maintains a record of all personnel entering or occupying the flight deck, including flight attendants or officers, who may on occasion have limited access to flight deck or controlled space, during the inclusive time period acoustic monitoring sub-system is in operation.

In the preferred embodiment, the flight deck door is equipped with a means of producing a distinct, identifiable sound, indicating the door has been opened. Once detected, the speaker verification biometric system 30, states, "IDENTIFY." The person opening the door responds with title and name, for example, "Flight Attendant, Judy Morrison."

The speaker verification biometric system 30 then compares the spoken words with speech recorded in the comparator database 33. If the words match the recorded data for that employee, no action is taken, other than logging the ingress and egress of the employee. If the voice is not detected, the system would again prompt "IDENTIFY". If a second response fails to match the comparator database 33,then an alert is transmitted through the SatCom communications link elements to the FDRC.

Any non-authorized voice detected by acoustic monitoring is sufficient to generate an automatic alert (Code 7500), which is forwarded to the FDRC by the SatCom communications link.

The alert signal is received by the FDRC (FIG. 3A), antenna 38, and transferred to the multi-channel SatCom transceiver 39, aircraft alert code processing 53 and comparison with system parameters 54, which determine whether the issued alert code is within defined parameters. Decision diamond 55 determines whether the alert received from the aircraft AE matches or exceeds criteria. In the event an alert code origin corresponds to detection of an unauthorized voice in the controlled space, then the decision diamond would return a NO.

If the decision diamond 55 returns a YES, alert verification process then references the alert signal to the alert status verification block 56 which compares detected voice(s) with the time/data indexed system log 60. If the detected voice matches recorded attributes of a given voice indicating authorization for the controlled area, then the decision diamond 58 returns a NO and the process would proceed to terminate alert and log 59.

If detected voice does not match any recorded voice in the time/data indexed system log 60, then the decision diamond 58 returns a YES, indicating the alert is valid.

The alert would then be transferred to hierarchy alert routing 49 for determining the corresponding agency or law enforcement entity dictated to receive notification of a compromise of the aircraft, as indicated in the block marked Notification Government/Law Enforcement Agencies 51.

The processing identified in blocks 49 and 51 above are transferred through connecting links 98 and 99, to FIG. 3B.

Processing steps disclosed in FIG. 3B derive prerequisite signals from FIG. 3A, resulting in initiate flight recorder query 62 (FIG. 3B), and generation of a flight query code 63, which is transmitted back to the AE through inclusive SatCom link elements.

Once received by antenna (FIG. 2, 24), the AE acts upon the query command and initiates a download sequence of the flight recorder sub-system through data-path 31, 27 to digital compression 19 or buffer 9, (depending upon specified protocols). Compressed data may be queried from storage device 20.

Audio flight recorder download is then transferred from AE through recorder query/relay 21, relaying indexed audio and/or video through dashed-lines data paths ("A", "V") to multi-channel SatCom transceiver 23, antenna 24 and satellites 25, 26 to the FDRC.

The FDRC (FIG. 3B) receives AE transmitted flight recorder contents through antenna 38, multi-channel SatCom transceiver 39, decision diamond 64, decompression 65 (when applicable), digital decoder (delimiter) 66 and branch router 67. It is at this juncture that audio data assumes a distinctly different path through the audio channel 69 of the branch router 67, to audio out and voice print generator 73. Associated with this block is an addressable non-volatile means of recording and archiving the digital audio recording extracted from the aircraft in audio storage 76.

Additional processing steps by the audio out and voice print generator 73 enabling extraction of specific intrinsic characteristics of the audio signal sufficient to produce a spectrogram (commonly called voice print) sufficient to provide means of aiding identification of the originator of phrases, words or utterances which originated from within the aircraft. Generation of spectrogram(s), in the manner described is continual and inclusive of the entire recorded duration of AE transmitted audio. This permits both audio and spectrogram display to be advanced or reversed in a synchronous manner, enabling analysis of any voice, sound or utterance contained within the downloaded AE flight recorder.

Indexed spectrogram output from audio out and voice print generator 73 is forwarded to audio/data graphic display compiler and recorder 74 where it is combined with aircraft-specific data corresponding to date, time, location from which the audio was obtained. This data includes aircraft identification, alarm codes (if applicable), flight number, origin, and destination. Current and historical positional coordinates are obtained by data recording and processing elements 81, 82 and 71. The combined spectrogram and indexed data is provided to end-users through transmission via government network 78 and encrypted government web download 77.

Figure 12:
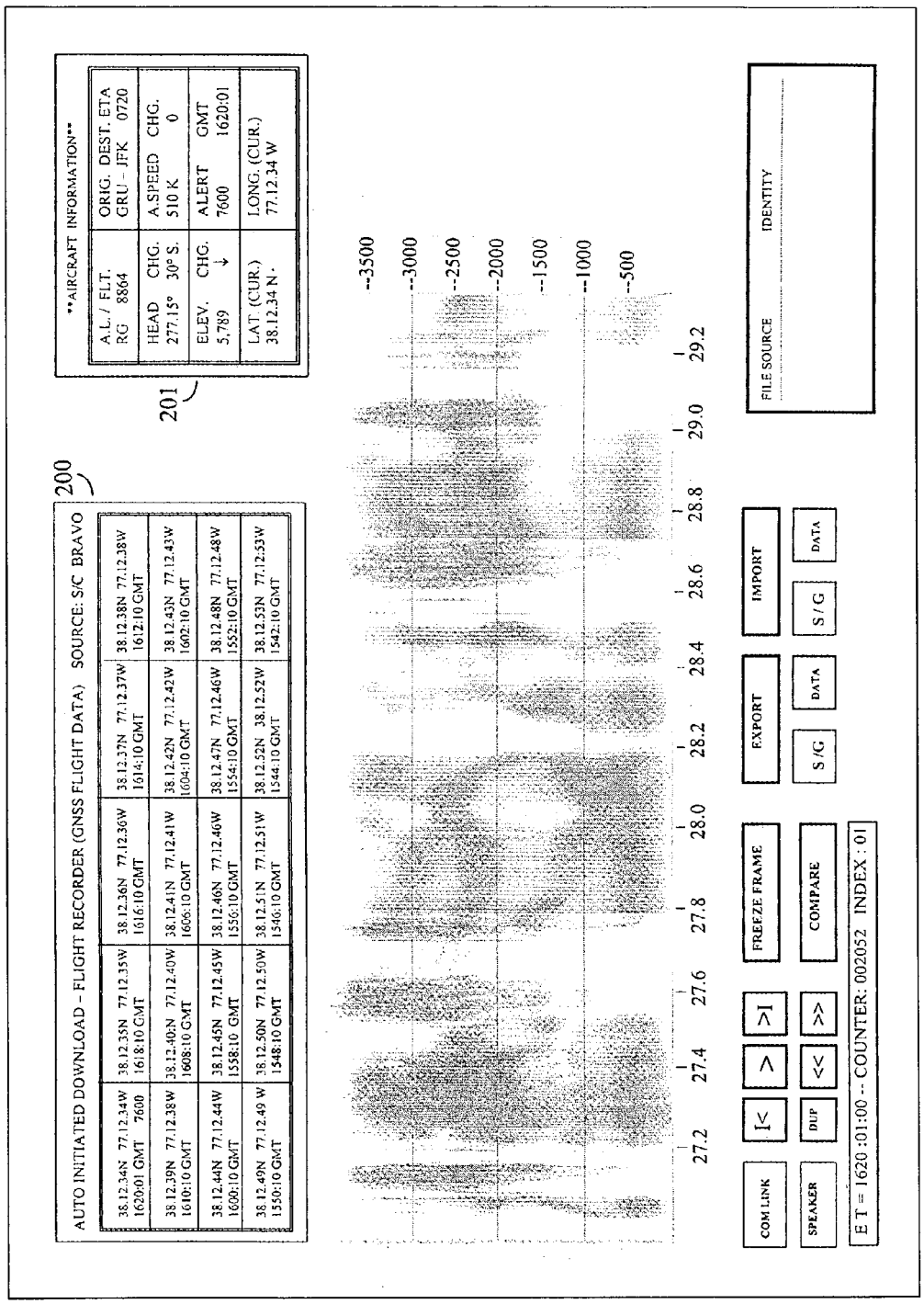
FIG. 12 illustrates the generation and graphic display of a spectrogram obtained from flight recorder downloaded audio.

FIG. 12 discloses a proposed spectrogram display generated in operation of the illustrated embodiment, which includes fully addressable inclusive contents of the audio portion of the downloaded contents of the flight recorder, indexed to sequential spectrogram frames, permitting end-users to advance or reverse audio, with concurrent dynamic display of the spectrogram corresponding to that portion of audio.

Controls are noted at the bottom of FIG. 12, demonstrating functions and controls available to the end-user, including Speaker which corresponds to an audio monitor; ComLink, which enables communication and collaborative comparison of spectrograms between two or more parallel correlated terminals or CRT displays within the same, or separate offices/agencies; Freeze Frame, which freezes an individual spectrogram frame; Compare, which permit comparison between FDRC produced spectrograms and reference audio data of the agency or end-user to facilitate comparison and identification, even if displayed on two parallel terminals. The frame at the lower right of FIG. 12 displays description of compared spectrograms and their source. The Import and Export buttons permit transfer of S/G (Spectrograms) and Data between agencies or offices.

Event Time (ET) displays the precise date and time that the current audio and spectrogram was recorded. GNSS buffer data table (FIG. 12, 200) illustrates a display of precise historical latitude and longitude of the aircraft from which the flight recording was obtained, and a highlighted frame or colored box identifies the position of the aircraft, corresponding to the precise portion of audio or spectrogram being reviewed. As the audio is advanced, the highlighted frame or colored box moves to the prior or following frame corresponding to the advancing or rewinding of the audio. In this manner, the end-user can focus on the events or audio that occurred in relationship to particular changes in the positional coordinates of the aircraft, or to quickly establish the positional location of the aircraft at the moment certain audio was detected.

Aircraft information 201 illustrates additional flight specific data corresponding to the subject aircraft. Certain data remains constant, regardless of the portion of audio being reviewed. This information includes airline, flight number, origin and destination of the subject aircraft. Additional information, such as heading, airspeed, change (course deviation), altitude and latitude(cur.), longitude(cur.) change incrementally as the audio is advanced or reversed. The change of data displayed in data table 201, corresponds to positional data displayed in data table 200.

Audio extracted elements and spectrogram may be provided to an encrypted Government Web Download 77 and Transmission Via Government Network 78, such as fiber-optic or other controlled communications means.

In the illustrated embodiment, recorded audio is obtained at a sample rate of 44.1 kHz mono, or 22.05 kHz stereo, thus producing an approximate frequency response range of 40–22,050 Hz for mono or approximately 40–11,025 Hz for stereo. This level of sound quality far exceeds the source quality necessary to produce a useable spectrogram. Additionally, the sampling rate and tonal range of the remotely acquired flight recorder audio is sufficient for comparison with existing databases of audio characteristics maintained by regulatory and/or government agencies.

Flight Recorder Sub-System

FIG. 2 displays essential elements associated with the flight recorder sub-system including the digital encoder 7, buffer system 9, digital compression 19, and storage device 20.

Remote access features of the flight recorder sub-system include a wireless communication (SatCom) link, permitting communication of commands from FDRC to AE, enabling download of accumulated flight recorder contents back to the FDRC, from one or more constituent elements of the flight recorder sub-system (buffer system 9 digital compression 19 or storage device 20)

Buffer System

The buffer system 9 may function as a stand-alone flight recorder system or a constituent element of a multistage flight recorder sub-system. The reason for differentiation of function is based upon manner it is addressed for recording and download function. Encoded data may be recorded into the buffer system 9 and later transmitted directly from this device to FDRC through the SatCom link, or transferred indirectly through intermediate digital compression 19.

In the illustrated embodiment, buffer system 9 functions as a constituent element of the flight recorder sub-system, providing initial and incremental storage of the most current recorded data up to a defined or programmable limit of chronologically linear input data. In this latter application, buffer system 9 provides immediate and definable means of recording and accessing flight data. Within the context of the preferred embodiment, the IC circular queue configuration of buffer system 9, enables recording durations which may readily exceed existing cockpit voice recorders by 500–900%. The secondary non-volatile storage device 20 utilizing magneto-optical or other suitable memory medium enables recording capacities equal to or exceeding transcontinental flight durations.

An important feature of the preferred embodiment of the present invention is the ability to transmit flight recorder contents to a ground-based location through inclusive elements of the SatCom link in LIFO (Last In First Out) mode. Paired with a means of compression, such as digital compression 19, audio and data may be downloaded rapidly, expediting transfer of flight recorder contents to the FDRC with most recent data transmitted first. If an event sufficient to produce an aircraft alert code occurs, FDRC may query buffer system 9, prompting AE (LIFO) transmission of most recent events, thus preserving data, audio and video relative to the event(s) responsible for initiating the alert sequence.

Buffer system query or download may be selected with or without digital compression 19 and may be initiated automatically or by the pilot in response to any circumstance deemed to indicate threat of imminent harm to the aircraft. This enables preservation of flight recorder contents through satellite transmission prior to any adverse event or damage to aircraft or the recording systems onboard.

The flight recorder buffer system 9 is composed of solid state or other electronic data storage medium employing a circular queue construct enabling defined channels of data, audio and video to be recorded and/or addressed separately. The illustrated embodiment permits user to program or set maximum recordable duration of the buffer, defined by chronological time or quantity of recorded elements. Also called buffer depth, this selectable limit establishes a boundary for sequential data being recorded to the buffer, beyond which it is deleted or new data entering the buffer simply records over the oldest chronological data. The programmable depth feature is useful in establishing flight recorder times commensurate with duration of given flights. As an example, a flight of short duration need not have as much memory as a trans-continental flight.

Flow of data includes delimited incrementally sampled positional data obtained from the GNSS receiver 3 through the programmable gate 4 and digital encoder 7, combined with contingent alert 35 codes, and AGL data obtained from the RA/GPWS 5, when applicable. All data is indexed by date, time and an aircraft identifying code.

Audio 29 and video 28 data is provided separately to the fight recorder buffer system 9 through the digital encoder 7.

Function and algorithms pertaining to operation of flight recorder buffer system 9, is further described below.

Function and Algorithms

Introduction

Audio data is acquired from at least one microphone 29 which is mounted within the cockpit, flight deck or other controlled space and is equipped with digital encoding hardware/software.

Audio data may be acquired at 44.1 kHz, which is compatible to CD quality recording and compatible with MP3 or MPEG compression. However, the number of channels and the audio sampling rate at which audio data is acquired and utilized by signal processing elements or sub-systems may differ from that employed in the illustrated embodiment. For example, audio data may be acquired in stereo at a sampling rate of 22.05 kHz, which approximates high quality FM stereo radio.

Video is acquired through one or more mounted video cameras 28 equipped with digital encoding hardware.

Under a number of commercially available or dedicated operating systems, audio and video data acquisition driver software is installed to provide a uniform programming interface and hide timing, synchronization and implementation details from the application layer programs.

Audio and video channels are acquired and recorded separately.

Software function of the present invention calls driver read command to acquire data for further processing.

Function Overview

Time Granularity. Audio, video and alert data is recorded for a set number of seconds called a TimeUnit and is stored as a data structure called DataUnit.

Circular Queue. To prevent over-writing available memory in buffer system 9, DataUnits are organized into a circular queue. A circular queue is a data structure that keeps a list of sequential memory references to each DataUnit. When the buffer system 9 becomes full, i.e. the last DataUnit in the list has been written to, subsequent storage continues from the beginning of the queue, overwriting the oldest records. Compressed data is stored on a non-volatile recording device (data storage device 20) such as a magneto-optical drive. It is organized in an array of data structures called CpDataUnit that mirror DataUnit stored in RAM. TransmitBuffer contains a copy of all current DataUnit being transmitted to SatCom unit, avoiding possible synchronization problems due to delays in transmission.

Variables. The depth of the buffer system, BuffDepth and time granularity TimeUnit are external inputs to program.

Pointers. Several memory acquisition reference values (pointers) are defined and include:
a) data_ptr—reference to where next DataUnit is to be written to
b) limit_ptr—reference to end of buffer
c) fifo_ptr—reference for FIFO download of data to SatCom link
d) lifo_ptr—reference for LIFO download of data to SatCom link
e) index1_ptr—reference for start of indexed download of data to SatCom link
f) index2_ptr—reference for end indexed download.

Algorithms

Initialization. Process input parameters BuffDepth and TimeUnit to calculate the amount of working memory required and how many entries the circular queue needs. Create circular queue data structure in memory. Initialize limit_ptr to last DataUnit record in queue. Set all other pointers (See Function Overview) to first record in queue.

Figure 5:
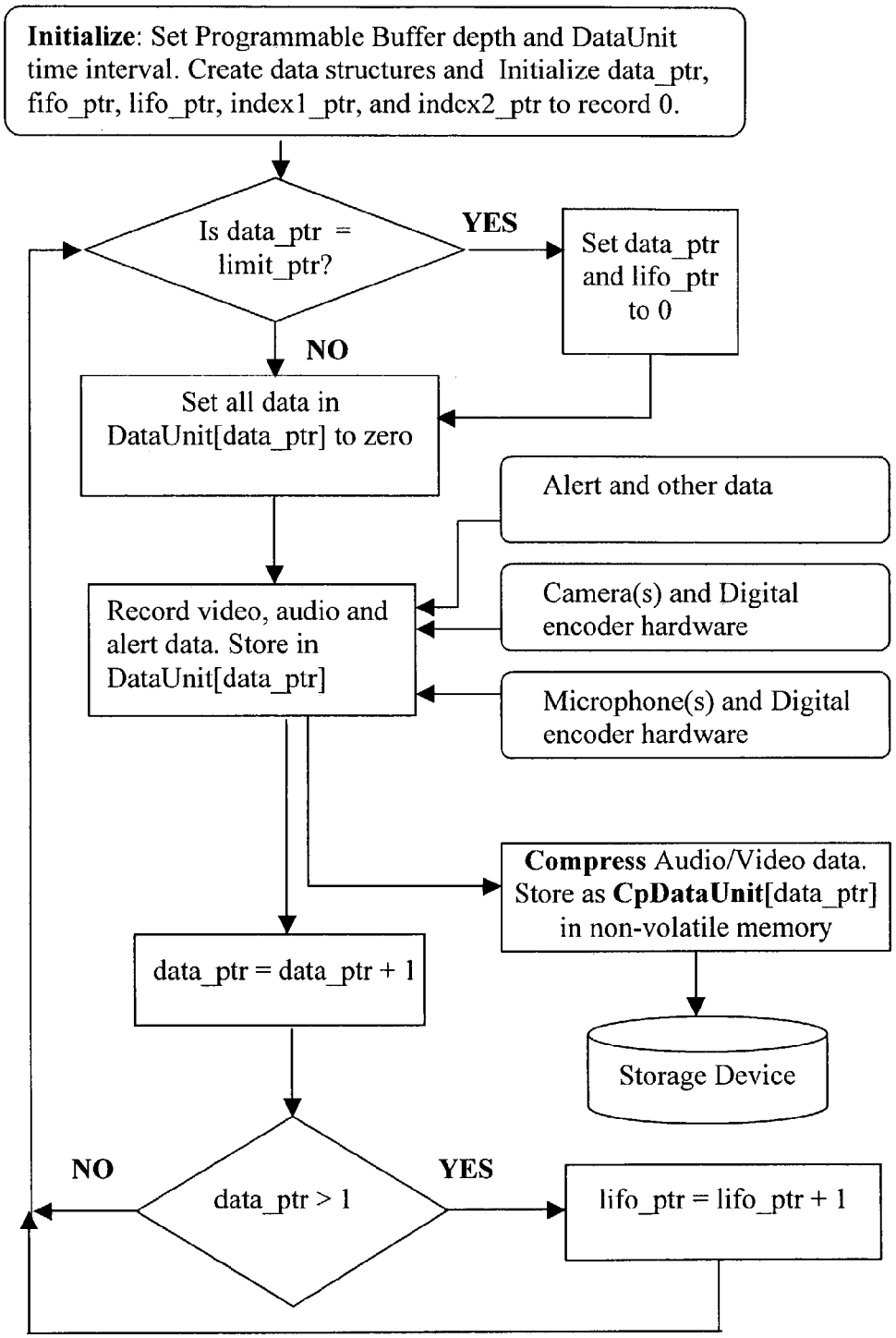
FIG. 5 is a flow chart identifying data acquisition function.
Figure 6:
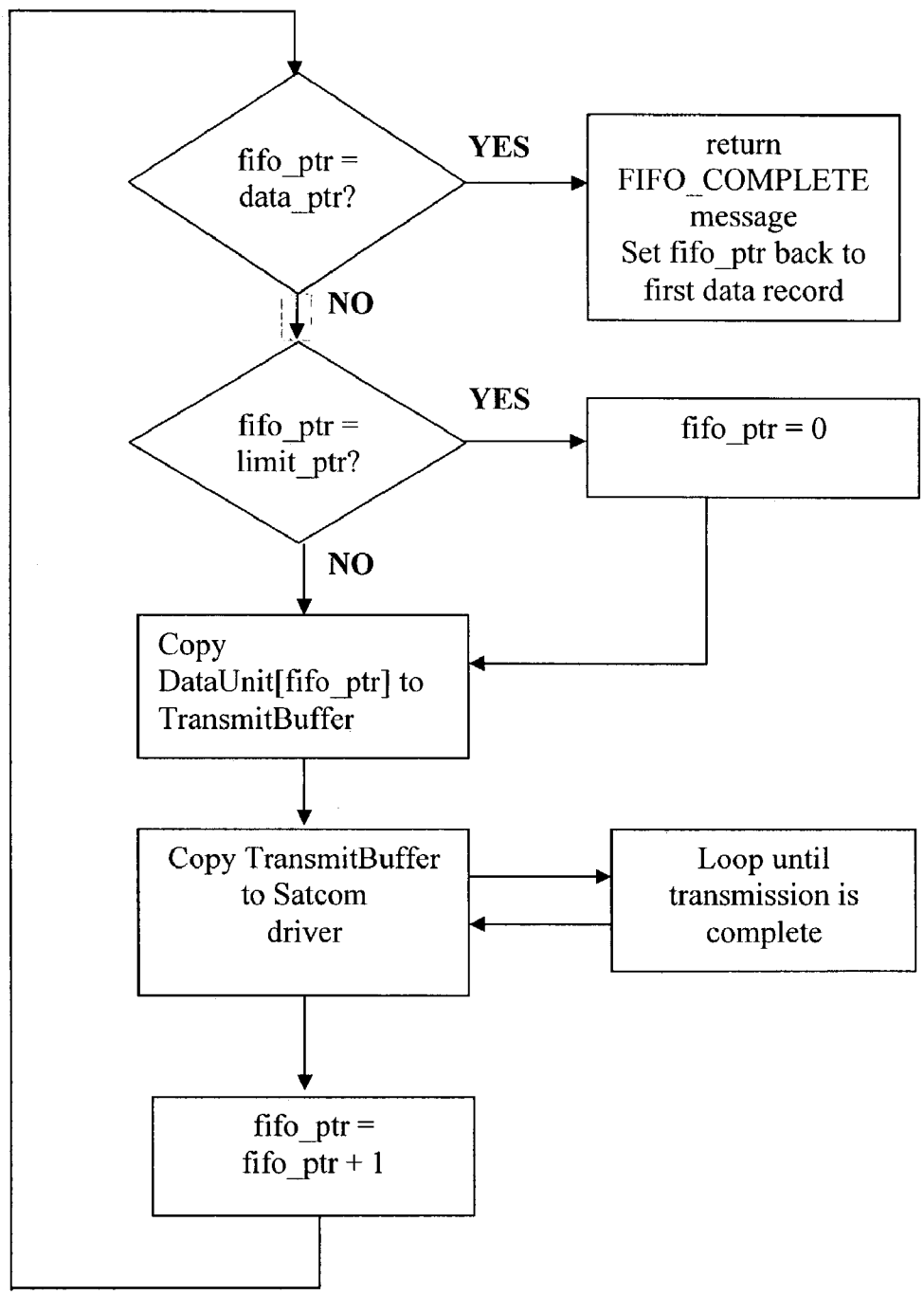
FIG. 6 is a flow chart illustrating FIFO data transfer, relative to download of the flight recorder element of the illustrated embodiment of the present invention.
Figure 7:
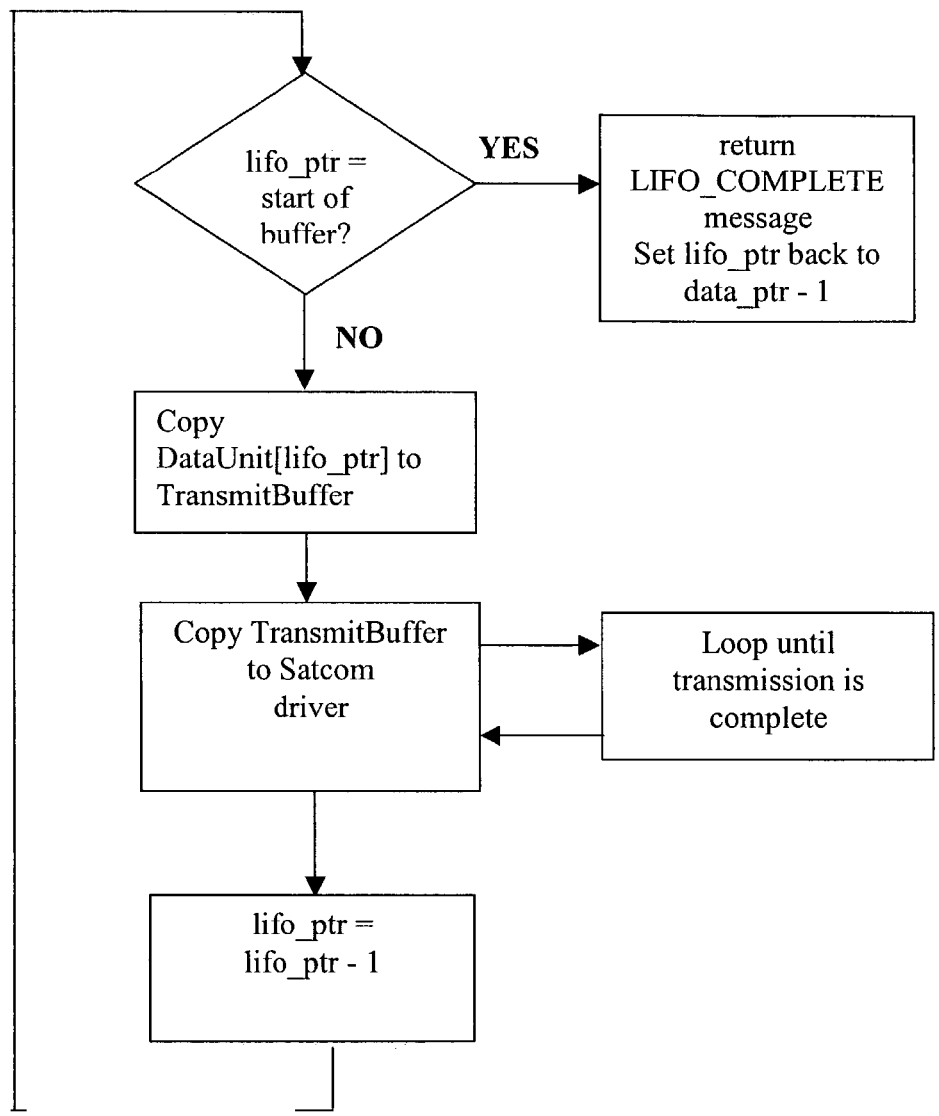
FIG. 7 is a flow chart representing LIFO data transfer, relative to download of the flight recorder element of the illustrated embodiment of the present invention.
Figure 8:
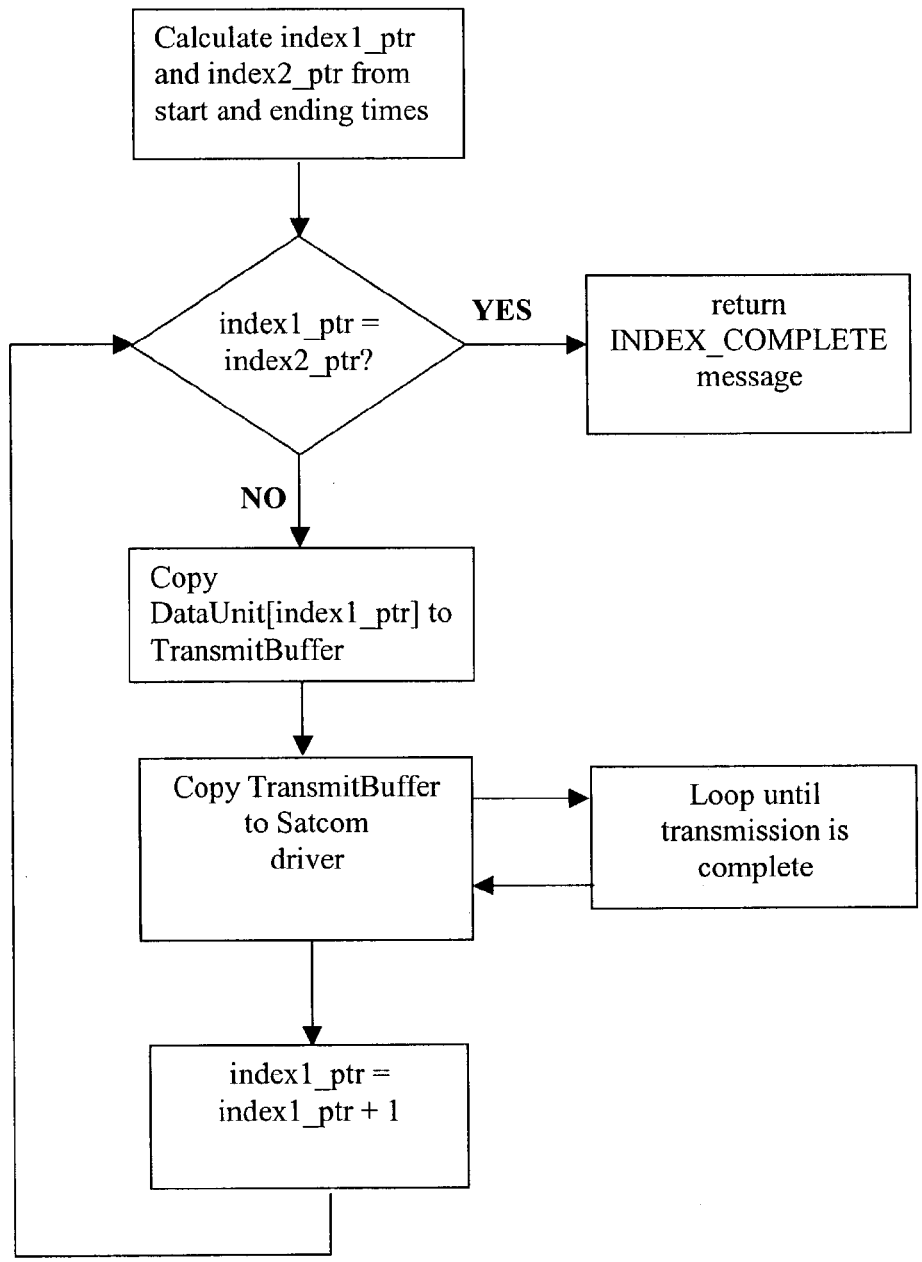
FIG. 8 is a flow chart identifying means of indexed data transfer (indexed access) relative to download of the flight recorder.

Data Acquisition from digital encoder 7. (FIG. 5) Check that data_ptr is not equal to limit_ptr. If it is, then set it to first record and begin recording over original data. Initialize records currently pointed to by data_ptr to zero. Call Read function driver routines for video, audio, and alert data. When the DataUnit[data_ptr] records have been stored in memory, call compression sub-routine for video and audio data and store CpDataUnit structure. Write CpDataUnit to non-volatile storage. Increment data_ptr. If data_ptr is greater than 1, then increment lifo_ptr. Repeat indefinitely or until stopped by program command. See FIG. 5 flowchart.

FIFO Download to SatCom link. (FIG. 6), FIFO stands for First In First Out and allows FDRC to request (Query) all the data from record in the buffer system FIG. 2, number 9, until the record currently being written by the digital encoder 7 hardware software driver. When recorder query/relay 21 receives an FDRC query command to download data in FIFO format from buffer system 9, the following sequences are executed:

1. The system checks to see if fifo_ptr is equal to data_ptr. This indicates that data is still being written to this DataUnit block and should not be accessed. A FIFO_COMPLETE reply is issued back to ground based control (FDRC), the loop is terminated and fifo_ptr is set back to the beginning of the buffer system 7.
2. Next, the system determines if fifo_ptr is equal to data_ptr. If confirmed, fifo_ptr is set to the first data record permitting copy of inclusive range of DataUnit's to TransmitBuffer. If fifo_ptr does not equal data_ptr, then DataUnit is copied to TransmitBuffer without adjusting the position of fifo_ptr.
3. The DataUnit record pointed to by fifo_ptr is copied to TransmitBuffer which will hold data until SatCom interface can send it via hardware driver Write command. As there is a delay due to satellite transmission latency, the program will similarly loop or if a multi-tasking operating system is running, be put to sleep until the interface is ready to accept data.
4. When the write to SatCom operation completes, fifo_ptr is incremented and the process repeats at step 1 above until fifo_ptr equals data_ptr.

LIFO Download to SatCom link. (FIG. 7) LIFO stands for Last In First Out and allows FDRC to query data from the most recent chronologically recorded data record to the oldest chronologically recorded data record in the buffer system 9. As shown in data acquisition algorithm section above, the lifo_ptr variable is incremented with data_ptr but points to the DataUnit record previous to the one that data is currently being written into. When the recorder query/relay 21 receives a flight recorder query command from the FDRC to download data in LIFO format from the buffer system 9, the following sequence of events are executed:

1. The system checks to see if lifo_ptr is equal to beginning of the buffer, indicating that all the data has been written and the operation is complete. A LIFO_COMPLETE reply is issued back to the FDRC through the SatCom link.
2. The DataUnit record pointed to by lifo_ptr is copied to TransmitBuffer which will hold data until SatCom interface can send it via hardware driver Write command. As there is a delay due to satellite transmission latency, the program will similarly loop or if a multi-tasking operating system is running, be put to sleep until the interface is ready to accept data.

3. When the write to SatCom operation completes, lifo_ptr is decremented and the process repeats at step 1 above until lifo_ptr equals the beginning of the buffer.

Indexed Download to Satcom link. (FIG. 8) In this case, the FDRC can request data, expressed as a single defined index or chronological reference point, or data that exists in the range between two index or chronological reference points. The sequence of steps necessary to execute an indexed download command are listed below:
1. The starting and ending times are converted to data index and assigned to index1_ptr and index2_ptr, respectively.
2. The values of index1_ptr and index2_ptr are checked to be sure that they lie within the time being recorded.
3. index1_ptr is checked to see if it is equal to index2_ptr. If it is, the operation is complete and an INDEX_COMPLETE message is sent to FDRC through the SatCom link.
4. The DataUnit record pointed to by lifo_ptr is copied to TransmitBuffer which will hold data until SatCom interface can send it via hardware driver Write command. As there is a delay due to satellite transmission latency, the program will similarly loop or if a multi-tasking operating system is running, be put to sleep until the interface is ready to accept data.
5. index_ptr is incremented and the process repeats at step 1 above until index1_ptr equals the index2_ptr.

Compression

Digital compression (FIG. 2, 19) is a selectable dependent element and function associated with the download process of buffer system 9. Additionally, digital compression compresses all digital data, audio and video data prior to being recorded in the non-volatile recording medium identified as storage device 20.

One of a number of existing compression algorithms are utilized in the processes of reducing data storage size and bandwidth, including but not limited to MP3, MPEG, and Motion J-PEG for video.

Data Storage Device—(Magneto-Optical)

The flight recorder storage device 20 provides functional aspects of a stand-alone flight recorder when coupled with digital compression 19 or as a constituent of the broader flight recorder sub-system of the illustrated embodiment.

In either application, the data recording means identified in the illustrated embodiment employs a non-volatile recording medium, such as magneto-optical, enabling substantially longer recording times compared to existing flight recorders. Current magneto-optical technology enables up to 9 GB of storage space in a removable platter medium, permitting removal and replacement at the conclusion of a given period of time or following an incident or accident involving the subject aircraft in which the device is installed.

In one embodiment of the present invention, the data storage device is housed within a crash-survivable enclosure.

Digitally encoded data is recorded in a sequentially timed linear order and is recorded in a single channel of the storage device 20. Audio and video are input as separate channels and may be recorded on separate tracks or even separate platters of the magneto-optical recording medium.

Storage device 20 permits accessible means of archiving data, concurrently or subsequently to data stored within buffer system 9. Input data, which is recorded in storage device 20 is first compressed to reduce the space occupied by the data and eliminate need for compression prior to transmission to FDRC through inclusive elements of the SatCom link.

Selectable means of download from the storage device 20 include, but are not limited to, FIFO (First In, First Out), LIFO (Last In First Out) or Indexed Access.

By incorporating storage device 20 into the flight recorder sub-system, it reduces need to set the depth of the buffer system 9 at a high level, since direct or supplemental access of archived data is possible through the storage device 20. The buffer system 9 provides a robust and more rapidly addressable and accessible architecture than storage device 20 ideally suited for storing more current data, downloadable in FIFO, LIFO or indexed access as compressed or non-compressed data. The recording medium of storage device 20 has slower access time but provides optimum non-volatile archival means that may contain selectably higher resolution video and audio than buffer system 9.

Incorporation of both buffer system 9 and storage device 20 provides three-fold fail-safe for recorded data, permitting remote retrieval from either or both recording elements while the aircraft is airborne and/or later physical retrieval of the magneto-optical cartridge from storage device 20.

FDRC Processing of Flight Recorder Download

Although remote query and download of AE flight recorder system may include singular indexed elements of audio, data or video, separate processing defines parsing and respective pathways for each form of downloaded data.

FDRC elements (FIG. 3B, numbers 38, 39) receive AE transmitted audio, data and video and process it in the following manner: Decision diamond 64 determines whether incoming data is compressed or not. If compressed, a YES is returned, transferring download through decompression 65 to digital decoder (delimiter) 66. If not compressed, decision diamond 64 returns a NO, and audio, data and video are transferred directly to digital decoder (delimiter) 66. This block decodes download into its respective original form(s) by removing delimiting characters that divide individual elements [date, time; sample rate, aircraft identifier; latitude, longitude; altitude; AGL and alert code, (if applicable)].

Digital decoder (delimiter) 66 operates in conjunction with branch router 67 in defining and parsing data into separate pathways relative to type of data, including branch router categories of data 68, audio 69 and video 70. Individual channels or paths of audio and video data received from the aircraft maintain data and chronological identifiers, including but not limited to date-time index markers and positional data sufficient to precisely correlate origination of recordings in relationship to time and location of the aircraft when recordings were made. Processing of audio and video signals through branch router 67 and subsequent audio and video processing elements include this reference data.

Delineated video signal elements are transferred from the branch router to video compiler 72, interpreting signal into a format sufficient for recording in an electronically addressable non-volatile archival video storage 75 and may be transmitted through encrypted Government Web Download 77 to regulatory and/or law enforcement agencies by means of Government End User Decryption. Discretionary rationale of this download is to provide key individuals or offices controlled access to downloaded data, relative to an incident involving an aircraft, regardless of the respective official's location at the time an incident occurs.

The present invention should not be interpreted to designate, include or exclude sharing of data with any particular location or agency. End user and governing agencies shall determine extent and protocol of any dissemination.

What is claimed is:

1. A combined airborne and ground-based system for monitoring an aircraft, comprising:
a first airborne means for receiving navigation signals and deriving a position vector therefrom,
a second airborne means for receiving an input representative of altitude of the aircraft above ground level,
a third airborne means for sampling said position vector and outputting a succession of samples of said position vector, representing successive discrete positions of the aircraft, wherein said third airborne means is responsive to the second airborne means such that the sample rate has a first substantially constant value in the event that the aircraft is at an altitude greater than a predetermined altitude and has a second substantially constant value, greater than the first constant value, in the event that the aircraft is at an altitude less than said predetermined altitude,
a fourth airborne means for receiving the succession of samples of the position vector from the third airborne means and generating data packets descriptive of said successive discrete positions of the aircraft,
a fifth airborne means for transmitting the data packets,
a first ground-based means for receiving the data packets,
a second ground-based means for extracting the aircraft position vector samples from the data packets, and
a third ground-based means for graphic display of the position vector samples.

2. A system according to claim 1, wherein each sample of said position vector includes a latitude value, a longitude value and an altitude above sea level value.

3. A system according to claim 1, wherein the data packets further contain an alphanumeric identifier.

4. A system according to claim 1, wherein the data packets further contain date and time values.

5. A system according to claim 1, wherein the first means receives navigation signals from global navigation satellites.

6. A system according to claim 1, wherein the second ground-based means calculates multiple aircraft flight parameters from the position vector samples.

7. A system according to claim 1, wherein the second ground-based means calculates at least one of aircraft heading, aircraft speed, and ground speed, aircraft path, and correlated terrestrial display parameter from the position vector samples.

8. A system according to claim 1, wherein the second ground-based means includes a means for comparing the position of the aircraft, represented by a position vector sample, with the positions of a plurality of ground-based facilities, selecting at least one of said ground-based facilities, and calculating a distance vector from the aircraft position to said one ground-based facility.

9. A system according to claim 8, wherein the second ground-based means includes a means for dynamically updating the graphic display of the distance vector in accordance with position vector samples contained in successive data packets received by the first ground-based means.

10. A system according to claim 8, wherein the second ground-based means includes a means for graphically displaying said distance vector and numerical data defining the magnitude of said distance vector.

11. A system according to claim 1, wherein the second airborne means includes a means for calculating a trajectory of the aircraft based on position vector samples contained in successive data packets received by the first ground-based means and for calculating a net terminal location of the aircraft based on intersection of projected trajectory of the aircraft with a terrestrial plane.

12. A combined airborne and ground-based system for monitoring an aircraft, comprising:
a first airborne means for receiving navigation signals and deriving an aircraft position vector therefrom,
a second airborne means for sampling said aircraft position vector at a selected sample rate and outputting a succession of samples of said aircraft position vector,
a third airborne means for receiving the succession of samples of the aircraft position vector and generating data packets that contain respective samples of the aircraft position vector, and
a fourth airborne means for transmitting the data packets,
a first ground-based means for receiving the data packets, and
a second ground-based means for extracting the aircraft position vector samples from the data packets and calculating an aircraft flight parameter from the position vector samples
wherein the second ground-based means includes a means for calculating a trajectory of the aircraft based on position vector samples contained in successive data packets received by the first ground-based means and for calculating a net terminal location of the aircraft based on terrain features and the trajectory of the aircraft,
and wherein the second ground-based means includes a means for conditionally asserting an alarm signal, a means for comparing current values of parameters that define the aircraft's trajectory with nominal values of those parameters and negating the conditional alarm signal in the event that the current values of the parameters match the nominal values within a predetermined tolerance, and a means operative in the event that the current values do not match the nominal values within said predetermined tolerance for comparing current values of control settings of the aircraft with stored values to determine whether adjustment of the control settings can influence the trajectory of the aircraft sufficiently to avoid collision with terrain features and, if so, canceling the alarm signal, and, if not, reporting the net terminal location to a ground-based facility for emergency response.

13. A system according to claim 12, wherein the second ground-based means includes a means for comparing the net terminal location of the aircraft with the positions of a plurality of ground-based facilities, selecting at least one of said ground-based facilities, and calculating a distance vector from each selected ground-based facility to the net terminal location.

14. A system according to claim 13, wherein the second ground-based means includes a means for graphically displaying said distance vector.

15. A combined airborne and ground-based system for monitoring an aircraft, comprising:
a first airborne means for receiving navigation signals and deriving an aircraft position vector therefrom,
a second airborne means for sampling said aircraft position vector at a selected sample rate and outputting a succession of samples of said aircraft position vector,
a third airborne means for receiving the succession of samples of the aircraft position vector and generating data packets that contain respective samples of the aircraft position vector, and
a fourth airborne means for transmitting the data packets, a first ground-based means for receiving the data packets, and a second ground-based means including a means for determining the position of the aircraft, represented by a position vector sample, selecting a spatial domain that includes the position of the aircraft, and providing a display of the spatial domain, the second ground-based means having a first state in which it displays the spatial domain as an air traffic control navigational display and a second state in which it displays the spatial domain and correlated terrestrial features that are not shown in the first state.

16. A combined airborne and ground-based system for monitoring an aircraft, comprising:

a first airborne means for receiving navigation signals and deriving an aircraft position vector therefrom, a second airborne means for sampling said aircraft position vector at a selected sample rate and outputting a succession of samples of said aircraft position vector, a third airborne means for receiving the succession of samples of the aircraft position vector and generating data packets that contain respective samples of the aircraft position vector, and a fourth airborne means for transmitting the data packets, a first ground-based means for receiving the data packets, and a second ground-based means including a means for comparing the position of the aircraft, represented by a position vector sample, with the positions of a plurality of ground-based facilities, allowing selection of one of said ground-based facilities, and calculating a distance vector from the aircraft position to said one ground-based facility, and wherein the second ground-based means includes a display means having a first state in which it displays general air-traffic control information pertaining to the vicinity of the selected ground-based facility and a second state in which it displays said distance vector and terrestrial features in the vicinity of the selected ground-based facility.

17. A combined airborne and ground-based system for monitoring an aircraft, comprising:

a first airborne means for receiving navigation signals and deriving an aircraft position vector therefrom, a second airborne means for sampling said aircraft position vector at a selected sample rate and outputting a succession of samples of said aircraft position vector, a third airborne means for receiving the succession of samples of the aircraft position vector and generating data packets that contain respective samples of the aircraft position vector, and a fourth airborne means for transmitting the data packets, a first ground-based means for receiving the data packets, and a second ground-based means including a means for comparing the position of the aircraft, represented by a position vector sample, with the positions of a plurality of ground-based facilities, allowing selection of one of said ground-based facilities, and calculating a distance vector from the aircraft position to said one ground-based facility, and wherein the second ground-based means includes a display means having a first state in which it displays general aircraft navigational information pertaining to the vicinity of the selected ground-based facility and a second state in which it displays said distance vector and terrestrial features in the vicinity of the selected ground-based facility.

18. A system according to claim 17, wherein the general aircraft navigational information that is displayed in the first state of the display means includes terrestrial information but does not include said terrestrial features.

19. A system according to claim 10, wherein the second ground-based means graphically displays updated position vector samples to a correlated terrestrial display parameter.

20. A system according to claim 10, wherein the second ground-based means graphically displays updated position vector samples and correlated terrestrial information.

21. A system according to claim 10, wherein the second ground-based means includes a means for determining the position of the aircraft, represented by a position vector sample, and the second ground-based means graphically displays updated position vector samples and terrestrial information regarding a spatial domain that includes the position of the aircraft.

22. A system according to claim 11, wherein the second ground-based means includes a means for conditionally asserting an alarm signal, a means for comparing current values of parameters that define the aircraft's trajectory with nominal values of those parameters and negating the conditional alarm signal in the event that the current values of the parameters match the nominal values within a predetermined tolerance, and a means operative in the event that the current values do not match the nominal values within said predetermined tolerance for comparing current values of control settings of the aircraft with stored values to determine whether the control settings can be adjusted sufficiently to avert intersection of the projected trajectory with the terrestrial plane and, if so, canceling the alarm signal, and, if not, transmitting the calculated net terminal location to a ground-based facility for emergency response.

23. A system according to claim 22, wherein the second ground-based means includes a means for comparing the net terminal location of the aircraft with the positions of a plurality of ground-based facilities, selecting at least one of said ground-based facilities, and calculating a distance vector from each selected ground-based facility to the net terminal location.

24. A system according to claim 23, wherein the second ground-based means includes a means for graphically displaying said distance vector.

* * * * *